(12) United States Patent
Omagari

(10) Patent No.: US 11,846,071 B2
(45) Date of Patent: Dec. 19, 2023

(54) DEFIBRATING APPARATUS AND FIBER BODY MANUFACTURING APPARATUS

(71) Applicant: SEIKO EPSON CORPORATION, Tokyo (JP)

(72) Inventor: Naoko Omagari, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/814,848

(22) Filed: Jul. 26, 2022

(65) Prior Publication Data
US 2023/0029664 A1 Feb. 2, 2023

(30) Foreign Application Priority Data
Jul. 28, 2021 (JP) .................. 2021-123140

(51) Int. Cl.
*D21F 9/04* (2006.01)
*B27N 3/04* (2006.01)

(52) U.S. Cl.
CPC .................. *D21F 9/04* (2013.01); *B27N 3/04* (2013.01)

(58) Field of Classification Search
CPC .......... D21F 9/04; B27N 3/04; B02C 18/062; B02C 18/06; D21B 1/06; D21B 1/063; D21B 1/08
See application file for complete search history.

(56) References Cited

U.S. PATENT DOCUMENTS

2020/0299897 A1* 9/2020 Yamasaki .............. D21B 1/061

FOREIGN PATENT DOCUMENTS

JP 2020-158944 A 10/2020

* cited by examiner

*Primary Examiner* — Eric Hug
*Assistant Examiner* — Matthew M Eslami
(74) *Attorney, Agent, or Firm* — Global IP Counselors, LLP

(57) ABSTRACT

In a defibrating apparatus, when a region, of a discharge path, including a discharge unit is a downstream discharge path, a region, of the discharge path, other than the downstream discharge path is an upstream discharge path, a region, of a screen, constituting the downstream discharge path is a downstream discharge screen, a region, of the screen, constituting the upstream discharge path is an upstream discharge screen, and a through-hole that causes a defibrating chamber to be in communication with the discharge path is a communication hole, the communication hole is provided on the screen such that the air is less likely to pass through the downstream screen than the upstream screen.

12 Claims, 15 Drawing Sheets

DEFIBRATING APPARATUS AND FIBER BODY MANUFACTURING APPARATUS

The present application is based on, and claims priority from JP Application Serial Number 2021-123140, filed Jul. 28, 2021, the disclosure of which is hereby incorporated by reference herein in its entirety.

BACKGROUND

1. Technical Field

The present disclosure relates to a defibrating apparatus and a fiber body manufacturing apparatus.

2. Related Art

JP-A-2020-158944 discloses a defibrating apparatus that discharges a defibrated product formed of a material through a discharge path extending along an outer side of an annular wall defining a defibrating chamber and a discharge pipe in communication with the discharge path, by rotation of a rotor accommodated in the defibrating chamber. In the defibrating apparatus, the discharge path and the defibrating chamber are in communication with each other through a plurality of through-holes proved on the annular wall of the defibrating chamber. In addition, the defibrated product formed in the defibrating chamber is discharged to the discharge path through the through-holes by an air flow generated by a pressure difference between the pressure in the defibrating chamber and the pressure in the discharge path.

However, in the defibrating apparatus described in JP-A-2020-158944, the pressure difference between the pressure in the downstream discharge path including the discharge unit where the discharge path and the discharge pipe are in communication with each other and the pressure of the upstream discharge path away from the discharge unit tends to increase. As a result, the velocity difference between the velocity of the air flow passing through the through-holes of the downstream annular wall constituting the downstream discharge path and the velocity of the air flow passing through the through-holes of the upstream annular wall constituting the upstream annular path tends to increase. Accordingly, the degree of defibration of the defibrated product discharged to the discharge path may vary.

SUMMARY

The present disclosure is a defibrating apparatus including a rotor that rotates around an axis center of a rotation shaft as a rotation center, a defibrating chamber that accommodates the rotor and in which a defibrated product is formed from a material containing a fiber by rotation of the rotor, a supply pipe that supplies the material to the defibrating chamber, a discharge path that is in communication with the defibrating chamber and to which the defibrated product is discharged from the defibrating chamber, a discharge pipe that discharges the defibrated product from the discharge path by negative pressure being applied, a discharge unit that causes the discharge path to be in communication with the discharge pipe, an annular wall having an annular shape that is provided and spaced from the rotor in a radial direction of the rotor and defines the defibrating chamber, a housing that forms the discharge path extending in a circumferential direction of the annular wall by covering an outer side of the annular wall, a plurality of through-holes that is provided in the annular wall and causes the defibrating chamber to be in communication with the discharge path, and an outer peripheral wall that is included in the housing and provided at an interval from the annular wall in the radial direction, in which the discharge unit is provided in the housing, and when a region, of the discharge path, including the discharge unit is a downstream discharge path, a region, of the discharge path, other than the downstream discharge path is an upstream discharge path, a region, of the annular wall, constituting the downstream discharge path is a downstream annular wall, a region, of the annular wall, constituting the upstream discharge path is an upstream annular wall, and the through-holes that cause the defibrating chamber to be in communication with the discharge path are communication holes, the communication holes are provided in the annular wall and, in a case in which the downstream annular wall is compared with the upstream annular wall having a same area as the downstream annular wall, air is less likely to pass through the downstream annular wall than the upstream annular wall.

The present disclosure is a fiber body manufacturing apparatus including the above-described defibrating apparatus, a web forming unit that forms a web by causing the defibrated product discharged from the discharge pipe to accumulate, and a fiber body forming unit that forms a fiber body containing the fiber by binding the fiber contained in the web.

DESCRIPTION OF EXEMPLARY EMBODIMENTS

Figure 1:
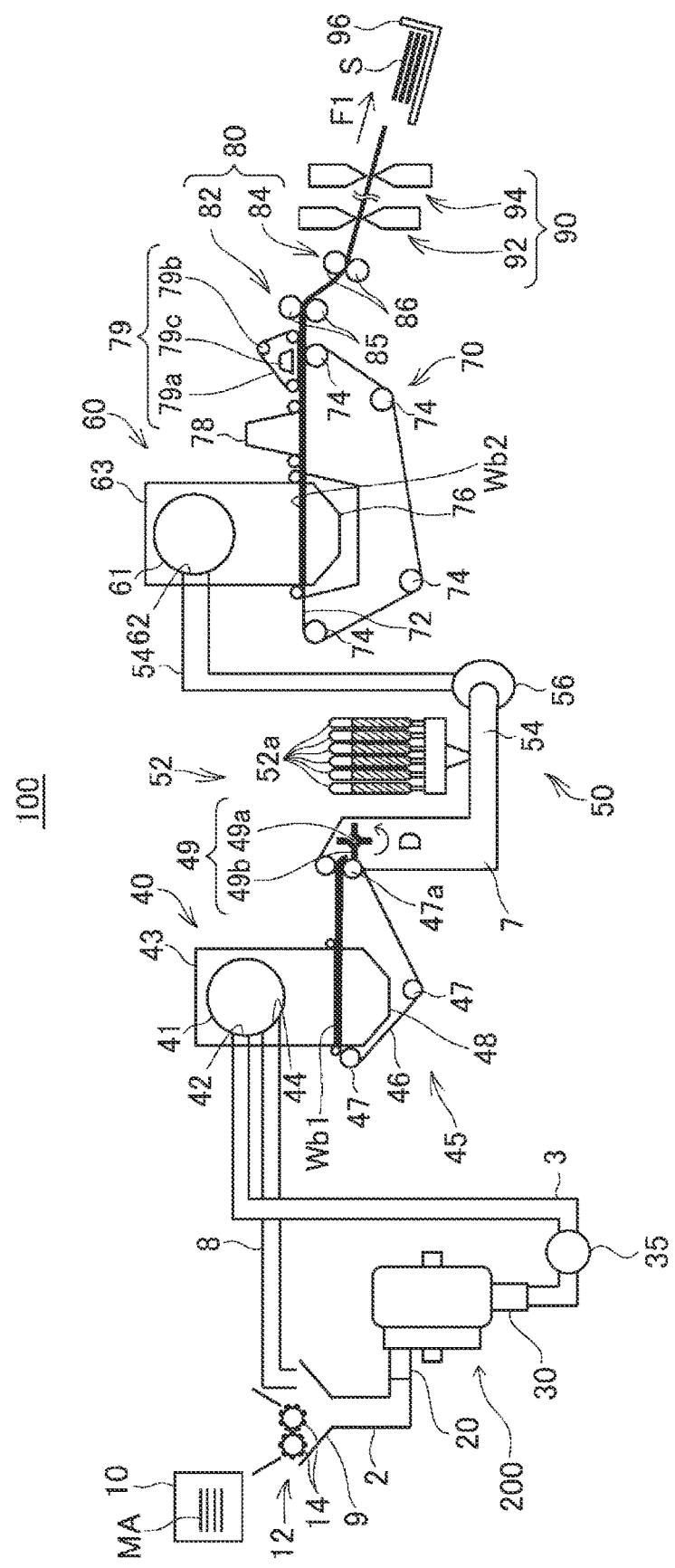
FIG. 1 is a schematic view illustrating a configuration of a sheet manufacturing apparatus as an embodiment of the present disclosure.
Figure 2:
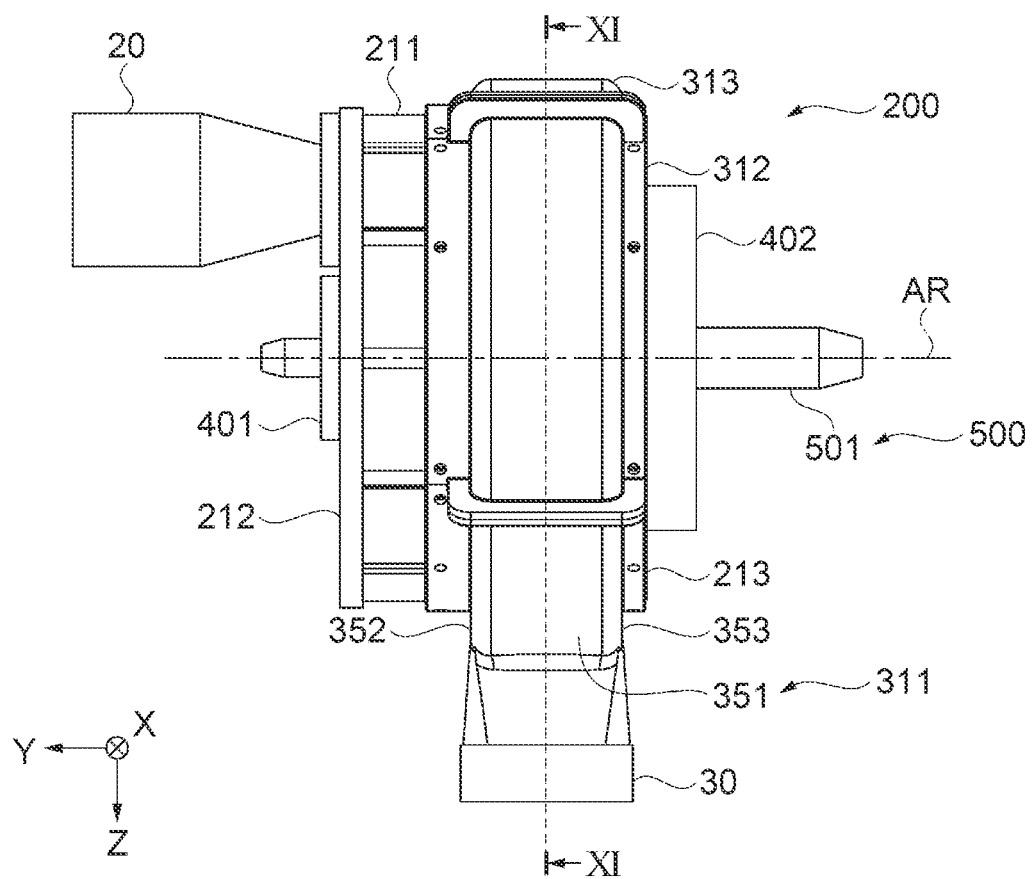
FIG. 2 is a side view of a defibrating apparatus as an embodiment of the present disclosure viewed from a −X direction side.
Figure 3:
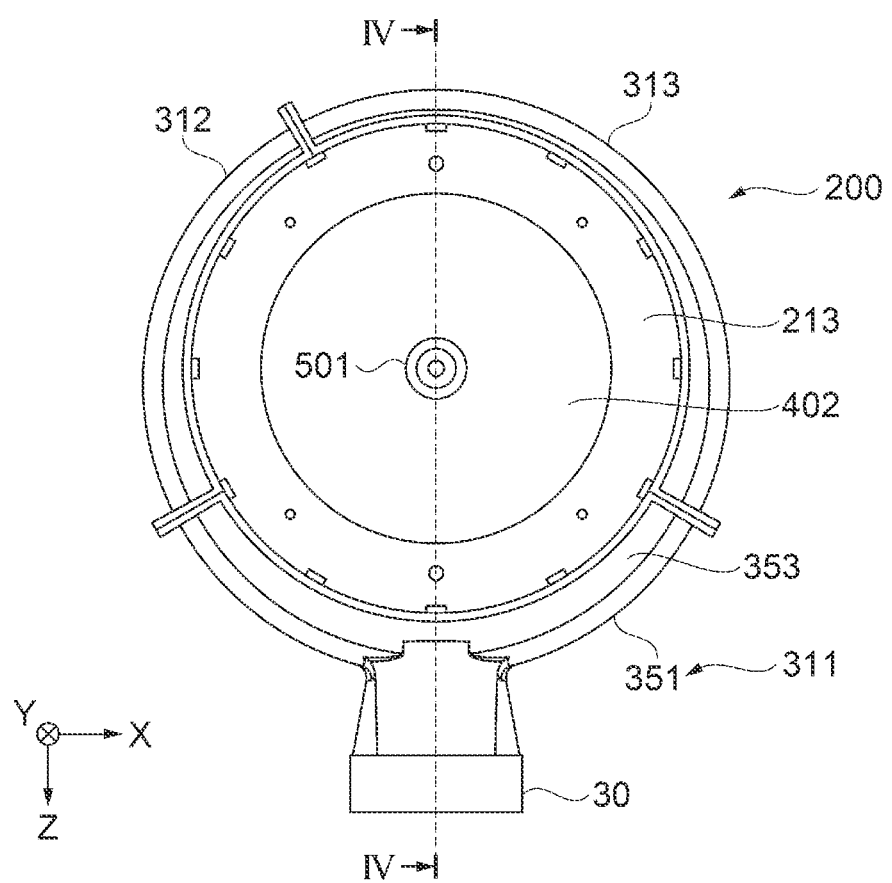
FIG. 3 is a side view of the defibrating apparatus viewed from a −Y direction side.

Hereinafter, the present disclosure will be described based on embodiments. In each figure, the same parts will be denoted by the same reference numerals, and redundant descriptions will be omitted. Note that in the specification, being the same includes not only being exactly the same, but also being the same in consideration of measurement errors, being the same in consideration of manufacturing variation of a part, and being the same within a range in which the function is not damaged. Therefore, for example, when two parts have the same dimension, in consideration of measurement errors and manufacturing variation of the parts, the dimensional difference between the two parts is within ±10%, more preferably within ±5%, further more preferably within ±3%.

In addition, in each figure, X, Y, and Z represent spatial axes that are orthogonal to each other. In the specification, directions extending along these axes are an X-axis direction, a Y-axis direction, and a Z-axis direction. When a direction is specified, a positive direction is denoted by "+", a negative direction is denoted by "−", a positive or negative sign is used in addition to the direction notion, and a description will be given considering that the direction in which an arrow in each figure is directed is a + (positive) direction and the direction opposite thereto is a − (negative) direction. In addition, the Z-axis direction indicates the gravitational direction, the +Z direction indicates vertically down, and the −Z direction indicates vertically up. In addition, a description will be given considering that a plane including the X-axis and the Y-axis is an X-Y plane, a plane including the X-axis and the Z-axis is an X-Z plane, and a plane including the Y-axis and the Z-axis is a Y-Z plane. In addition, the X-Y plane is a horizontal plane. Moreover, the three spatial axes of X, Y, and Z for which a positive or negative direction is not limited are described as the X-axis, the Y-axis, and the Z-axis.

1. First Embodiment

A configuration of a sheet manufacturing apparatus 100 according to a first embodiment will be described. The sheet manufacturing apparatus 100 performs reproduction processing by fiberizing a material MA containing a fiber and reproducing the material MA into a new sheet S. The sheet manufacturing apparatus 100 is an example of a fiber body manufacturing apparatus. Moreover, the sheet S is an example of a fiber body.

As illustrated in FIG. 1, the sheet manufacturing apparatus 100 includes a storage supply unit 10, a crushing unit 12, a defibrating apparatus 200, a sorting unit 40, a first web forming unit 45, a rotor 49, a mixing unit 50, an accumulating unit 60, a second web forming unit 70, a transporting unit 79, a sheet forming unit 80, and a cutting unit 90.

The storage supply unit 10 is an automatic feeder that stores the material MA and continuously feeds the material MA to the crushing unit 12. The material MA is sufficient as long as it contains a fiber and is, for example, used paper, waste paper, and a pulp sheet.

The crushing unit 12 includes a crushing blade 14 that cuts the material MA supplied by the storage supply unit 10 and cuts the material MA in air into a few centimeters long quadrangles. A shredder, for example, can be used as the crushing unit 12. The material MA cut in the crushing unit 12 is collected by a hopper 9 and is transported to a supply pipe 20 of the defibrating apparatus 200 through a pipe 2.

A crushed piece is transported from the crushing unit 12 to the defibrating apparatus 200 by an air flow. In the defibrating apparatus 200, the crushed piece is supplied from the supply pipe 20 to a defibrating chamber 210 described later, and by rotation of a rotor 500 accommodated in the defibrating chamber 210, the crushed piece is defibrated.

To a pipe 3 coupled to a discharge pipe 30, a suction unit 35 is provided. The suction unit 35 includes a blower that can apply negative pressure to the discharge pipe 30 by sucking air on the discharge pipe 30 side in the pipe 3. A defibrated product in the defibrating chamber 210 is discharged from the defibrating apparatus 200 through a discharge path 310 described later and the discharge pipe 30 by an air flow generated by the negative pressure applied to the discharge pipe 30. The defibrated product discharged from the defibrating apparatus 200 is transported to the sorting unit 40 through the pipe 3 coupled to the discharge pipe 30. The configuration of the defibrating apparatus 200 will be described later.

The sorting unit 40 sorts elements contained in the defibrated product by size. The sorting unit 40 has a drum portion 41 and a housing portion 43 accommodating the drum portion 41. As the drum portion 41, for example, a sieve is used.

As the drum portion 41 rotates, the defibrated product introduced from an introduction port 42 into the drum portion 41 is sorted into a passing product that passes through an opening of the drum portion 41 and a remaining product that does not pass through the opening. A first sorted product, which is the passing product that has passed through the opening, falls through the housing portion 43 toward a first web forming unit 45.

In addition, a second sorted product, which is the remaining product that does not pass through the opening, is transported again to the supply pipe 20 of the defibrating apparatus 200 through a pipe 8 and the pipe 2 from a discharge port 44 in communication with the inside of the drum portion 41.

The first web forming unit 45 includes a mesh belt 46, stretching rollers 47 and 47a, and a suction unit 48. The mesh belt 46 is an endless belt and stretched between the stretching rollers 47 and 47a. The mesh belt 46 goes around an orbit constituted by the stretching rollers 47 and 47a. A part of the orbit of the mesh belt 46 is planar below the drum portion 41, and the mesh belt 46 constitutes a planar surface. The suction unit 48 corresponds to a suction mechanism.

Many openings are formed in the mesh belt 46. Elements, of the first sorted product falling from the drum portion 41 located above the mesh belt 46, larger than the openings of the mesh belt 46 accumulate on the mesh belt 46. On the other hand, elements, of the first sorted product, smaller than the openings of the mesh belt 46 pass through the openings.

The suction unit 48 includes a blower (not illustrated) and sucks air from a side opposite to the drum portion 41 with respect to the mesh belt 46. The elements that pass through the openings of the mesh belt 46 are sucked by the suction unit 48. An air flow sucked by the suction unit 48 has an effect of promoting accumulation by drawing, to the mesh belt 46, the first sorted product falling from the drum portion 41.

The elements accumulating on the mesh belt 46 form a web shape and constitute a first web Wb1. The basic configurations of the mesh belt 46, the stretching rollers 47 and 47a, and the suction unit 48 are the same as those of a mesh belt 72, stretching rollers 74, and a suction mechanism 76 of the second web forming unit 70 described later.

The first web Wb1 is transported to the rotor 49 by movement of the mesh belt 46.

The rotor 49 includes a base 49a coupled to a driving unit such as a motor (not illustrated) and a projection 49b projecting from the base 49a and, by rotation of the base 49a in a direction D, the projection 49b rotates around the base 49a.

The rotor 49 is located at an end on the stretching roller 47a side of a planar portion of the orbit of the mesh belt 46. Since the orbit of the mesh belt 46 is bent downward at the end, the first web Wb1 transported by the mesh belt 46 projects from the mesh belt 46 and comes into contact with the rotor 49. The first web Wb1 is unraveled by collision of the projection 49b with the first web Wb1 and becomes a small fiber mass. The mass passes through a pipe 7 located below the rotor 49 and is transported to a mixing unit 50.

The mixing unit 50 mixes the first sorted product with an additive. The mixing unit 50 has an additive supply unit 52 that supplies an additive, a pipe 54 that transports the first sorted product and the additive, and a mixing blower 56.

The additive supply unit 52 supplies an additive formed of fine powder or a fine particle in an additive cartridge 52a to the pipe 54.

The additive supplied from the additive supply unit 52 contains a resin for binding a plurality of fibers, that is, a binding agent. The resin contained in the additive melts when passing through the sheet forming unit 80 and binds the plurality of fibers.

The mixing blower 56 generates an air flow in the pipe 54 that couples the pipe 7 to the accumulating unit 60. In addition, the first sorted product transported to the pipe 54 from the pipe 7 and the additive supplied to the pipe 54 by the additive supply unit 52 are mixed together when passing through the mixing blower 56.

The accumulating unit 60 loosens fibers of a mixture and disperses the fibers in the air to cause the fibers to fall onto the second web forming unit 70.

The accumulating unit 60 has a drum portion 61, an introduction port 62 that introduces the mixture into the drum portion 61, and a housing portion 63 that accommodates the drum portion 61. The drum portion 61 has a cylindrical structure body configured in the same manner as the drum portion 41, for example, and, similarly to the drum portion 41, rotates by power of a motor (not illustrated) and functions as a sieve.

The second web forming unit 70 is disposed below the drum portion 61. For example, the second web forming unit 70 has a mesh belt 72, a stretching roller 74, and a suction mechanism 76.

From the mixture falling from the drum portion 61 located above the mesh belt 72, elements larger than the openings of the mesh belt 72 accumulate on the mesh belt 72. The elements accumulating on the mesh belt 72 form a web shape and constitute a second web Wb2.

In a transportation path of the mesh belt 72, a humidity control unit 78 is provided downstream of the accumulating unit 60. By moisture provided by the humidity control unit 78, the moisture content of the second web Wb2 is controlled. Therefore, an effect for suppressing, for example, clinging of fibers onto the mesh belt 72 due to static electricity can be expected.

The second web Wb2 is peeled off the mesh belt 72 and is transported to the sheet forming unit 80 by the transporting unit 79. The transporting unit 79 has, for example, a mesh belt 79a, a roller 79b, and a suction mechanism 79c. The suction mechanism 79c includes a blower (not illustrated) and generates an upward air flow through the mesh belt 79a by a suction force of the blower. By the air flow, the second web Wb2 is separated from the mesh belt 72 and sucked onto the mesh belt 79a. The mesh belt 79a is moved by rotation of the roller 79b and transports the second web Wb2 to the sheet forming unit 80.

The mesh belt 79a is configured with an endless belt having openings, similarly to the mesh belt 46 and the mesh belt 72.

The sheet forming unit 80 adds heat to the second web Wb2 so as to bind fibers derived from the first sorted product contained in the second web Wb2 by the resin contained in the additive.

The sheet forming unit 80 includes a pressurizing unit 82 that pressurizes the second web Wb2 and a heating unit 84 that heats the second web Wb2 pressurized by the pressurizing unit 82. The pressurizing unit 82 pressurizes the second web Wb2 under a prescribed nip pressure by a pair of calender rollers 85 and transports the second web Wb2 toward the heating unit 84. The heating unit 84 pinches and heats the second web Wb2 whose density has been increased by a pair of heating rollers 86 and transports the second web Wb2 to the cutting unit 90. The resin contained in the second web Wb2 is heated in the heating unit 84 and the second web Wb2 becomes the sheet S. The sheet forming unit 80 is an example of a fiber body forming unit.

The cutting unit 90 cuts the sheet S formed in the sheet forming unit 80. The cutting unit 90 has a first cutting unit 92 that cuts the sheet S in a direction intersecting with a transportation direction F1 of the sheet S illustrated in the figure and a second cutting unit 94 that cuts the sheet S in a direction parallel to the transportation direction F1. The cutting unit 90 cuts the sheet S into a prescribed length and width to form the sheet S, which is a single strip. The sheet S cut by the cutting unit 90 is accommodated in a discharge unit 96.

Next, the configuration of the defibrating apparatus 200 will be described. The defibrating apparatus 200 performs processing for unraveling the material MA in which a plurality of fibers is bound into individual fibers or a few fibers. The defibrating apparatus 200 is a dry defibrating processing apparatus that performs processing such as defibration not in a liquid but in air such as the atmosphere and the air.

As illustrated in FIGS. 2 to 5, the defibrating apparatus 200 includes the rotor 500, the defibrating chamber 210, the supply pipe 20, the discharge path 310, and the discharge pipe 30. As the rotor 500 accommodated in the defibrating chamber 210 rotates around an axis center AR of a rotation shaft 501 as a rotation center, the defibrating apparatus 200 forms a defibrated product from the material MA supplied through the supply pipe 20. In addition, the defibrating apparatus 200 includes a screen 221 that defines the defibrating chamber 210, a fixing member 211, side walls 212 and 213, housings 311, 312, and 313 that define the discharge path 310, supporting portions 401 and 402 that support the rotor 500, and a closing member 601. In addition, in the following description, a rotation direction in which the rotation shaft 501 rotates around the axis center AR may be called a circumferential direction CR, and a radial direction of the rotation shaft 501 may be called a radial direction RR.

The rotor 500 has the rotation shaft 501, a base 502, a rotary blade 503, and a rotary vane 504. The rotor 500 is accommodated in the defibrating chamber 210 such that the axis center AR of the rotation shaft 501 extends along the Y-axis. Accordingly, the rotation shaft 501 extends in the Y-axis direction. In other words, the defibrating apparatus 200 is disposed in the sheet manufacturing apparatus 100 while being oriented such that the axis center AR is horizontal. The base 502 has a disk shape, and the rotation shaft 501 is put through the base 502 such that the base 502 is fixed. The rotary blade 503 is provided so as to project in a direction away from the base 502 in the radial direction RR. The rotary blade 503 has a plate-like projection shape. A plurality of rotary blades 503 is formed at intervals in the circumferential direction CR.

Figure 5:
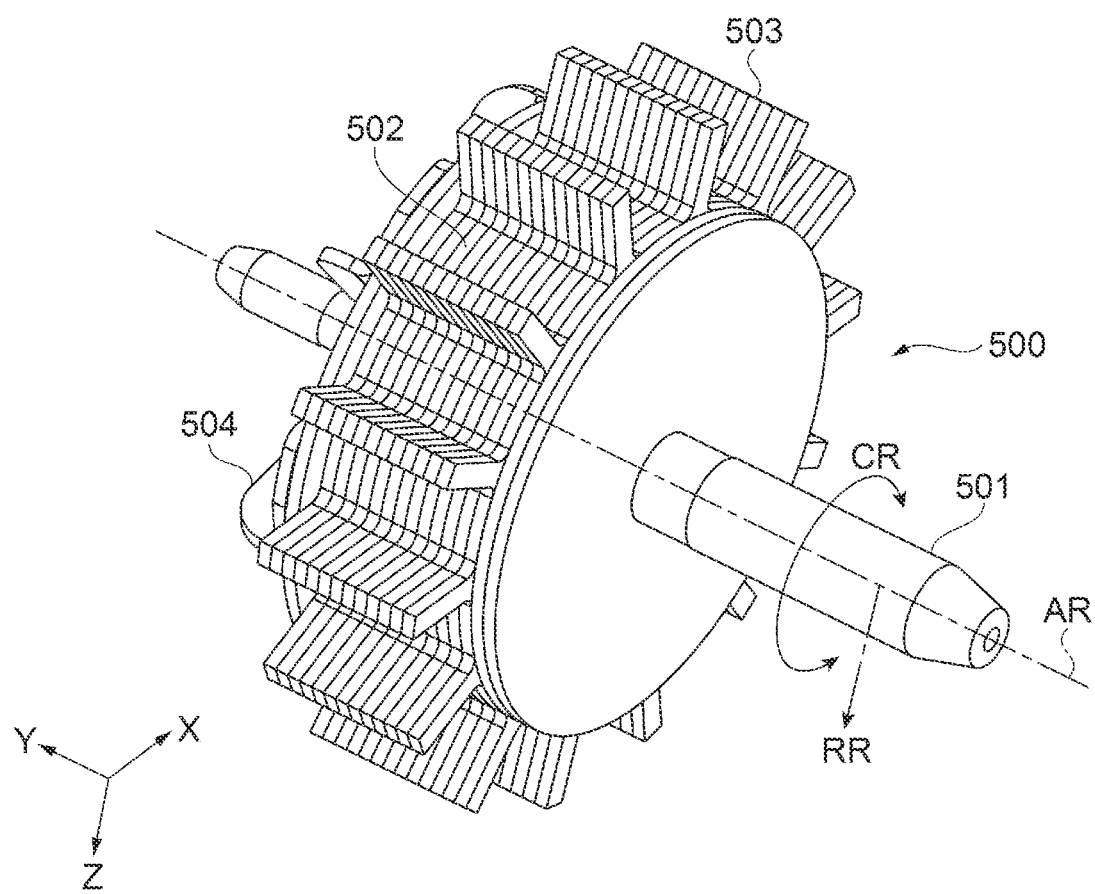
FIG. 5 is a perspective view illustrating a rotor.

On the +Y direction side of the base 502, a plurality of rotary vanes 504 is provided at intervals in the circumferential direction CR. As FIG. 5 illustrates, in the present embodiment, thin plates are laminated in the Y-axis direction so as to form the rotary blades 503 and the base 502, but an integrally formed block may form the rotary blades 503 and the base 502.

Figure 4:
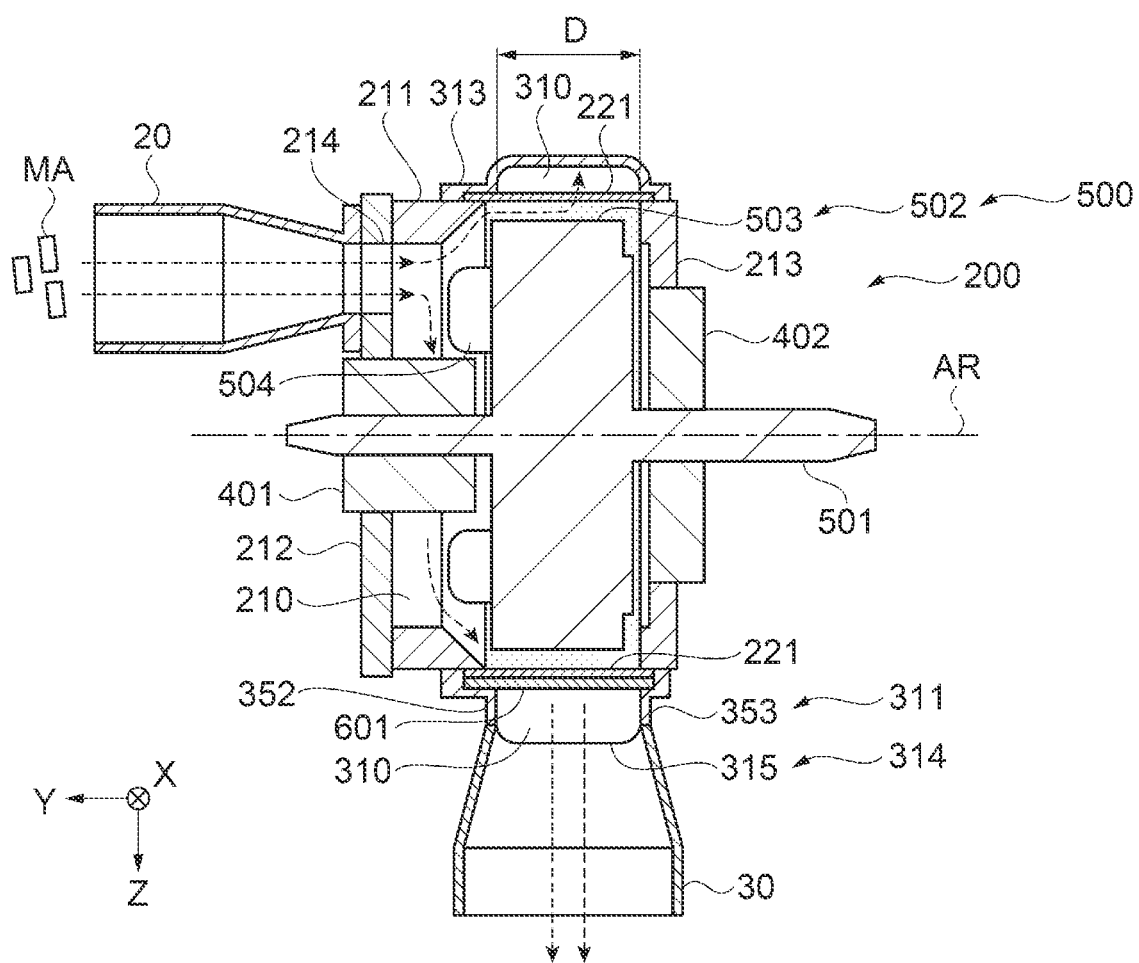
FIG. 4 is a sectional view illustrating an IV-IV cross section illustrated in FIG. 3.
Figure 6:
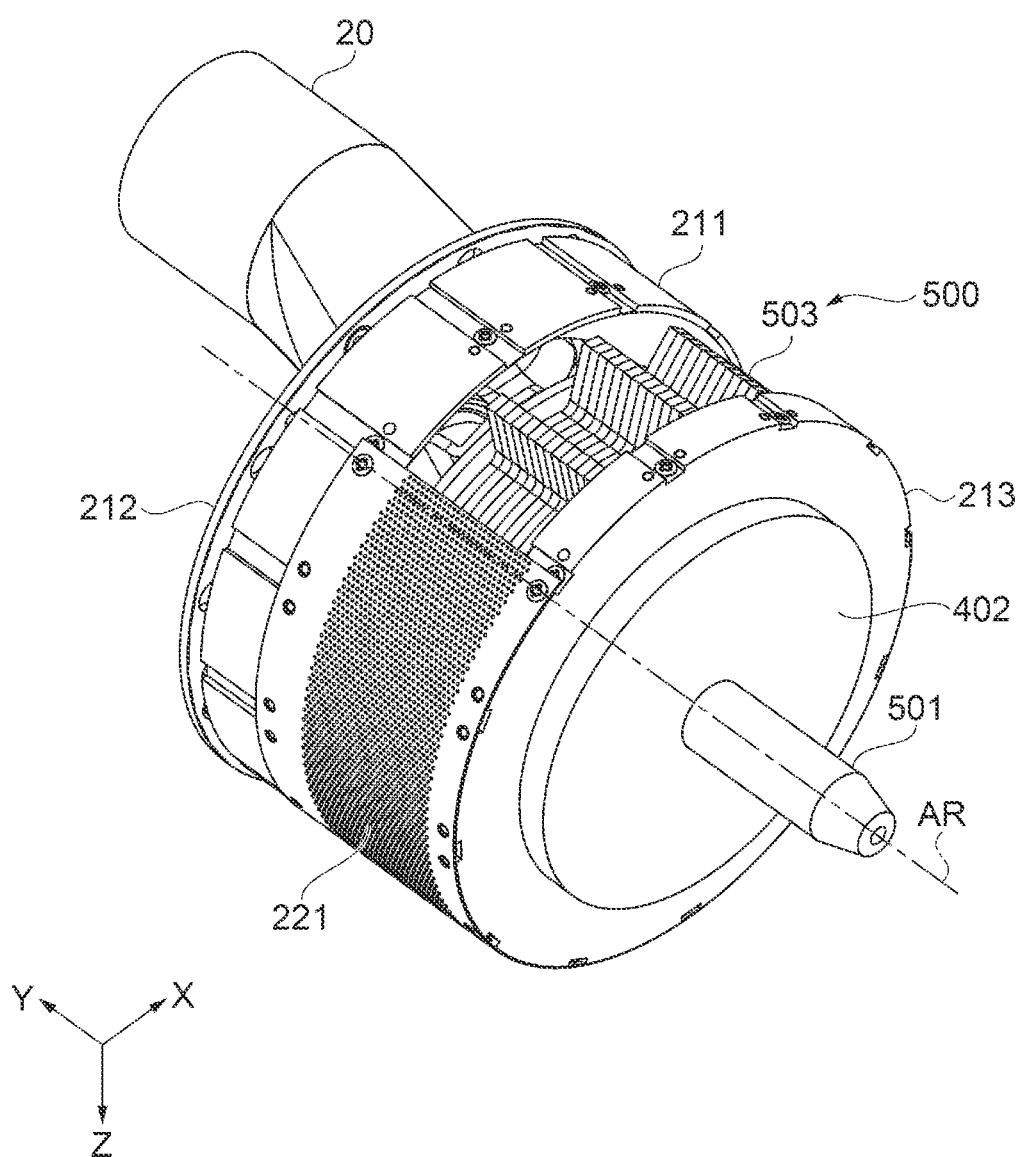
FIG. 6 is a perspective view illustrating a defibrating chamber excluding a part of a screen.

As FIGS. 4 and 6 illustrate, the fixing member 211 has a cylindrical shape. The fixing member 211 is located on the +Y direction side of the rotary blades 503 in the Y-axis direction.

Figure 10:
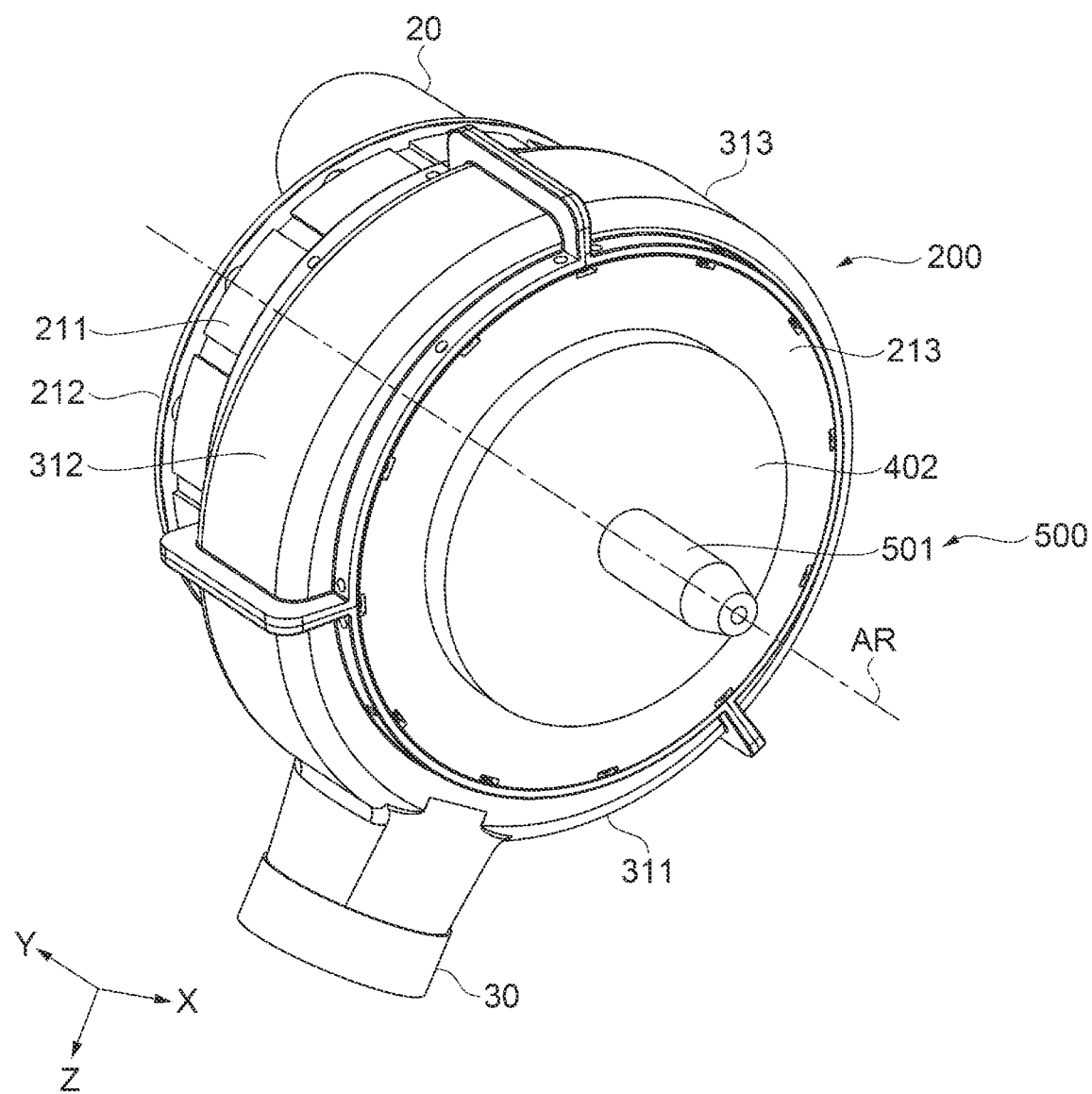
FIG. 10 is a perspective view illustrating the defibrating apparatus.
Figure 12:
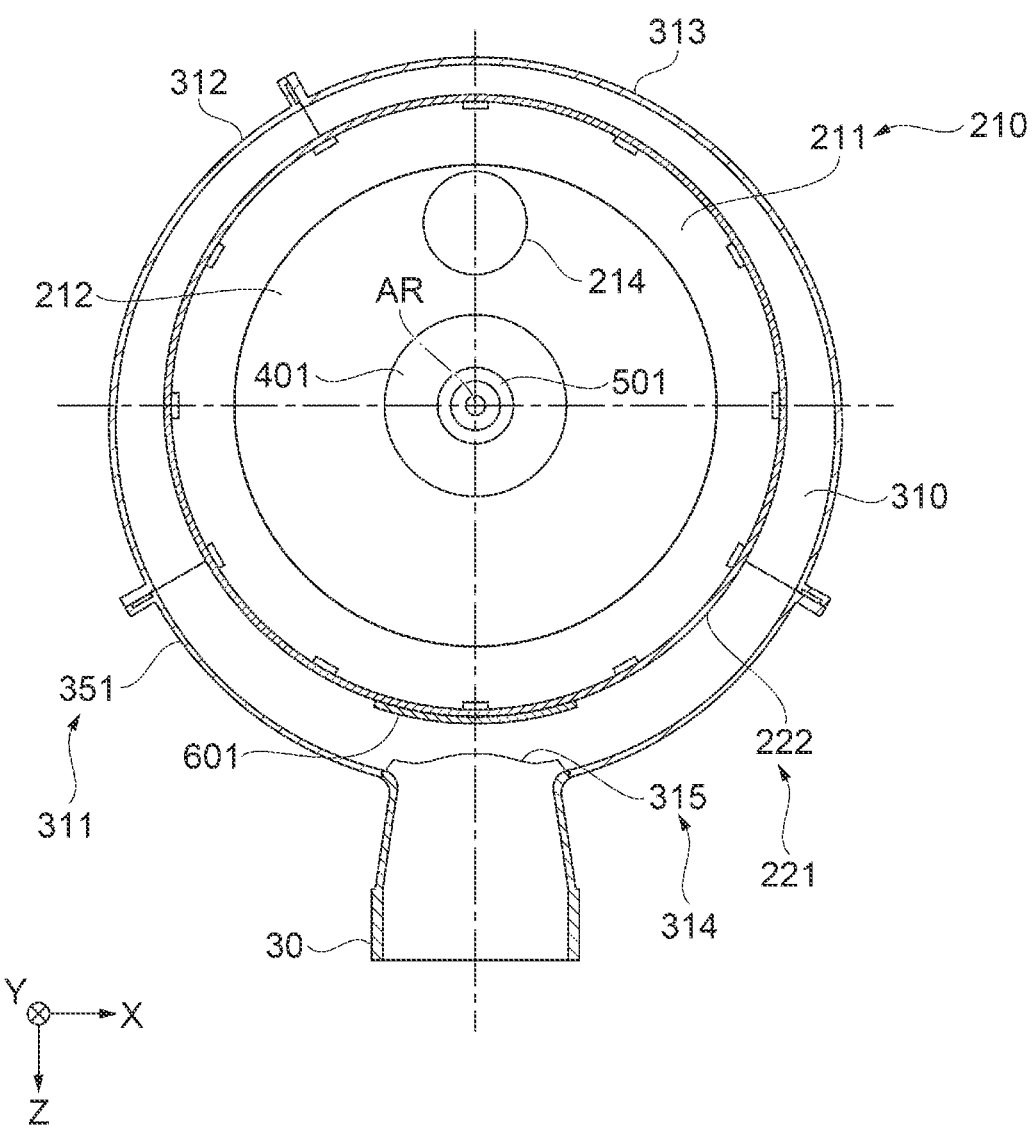
FIG. 12 is a sectional view illustrating a state in which the rotor is excluded from FIG. 11.
Figure 13:
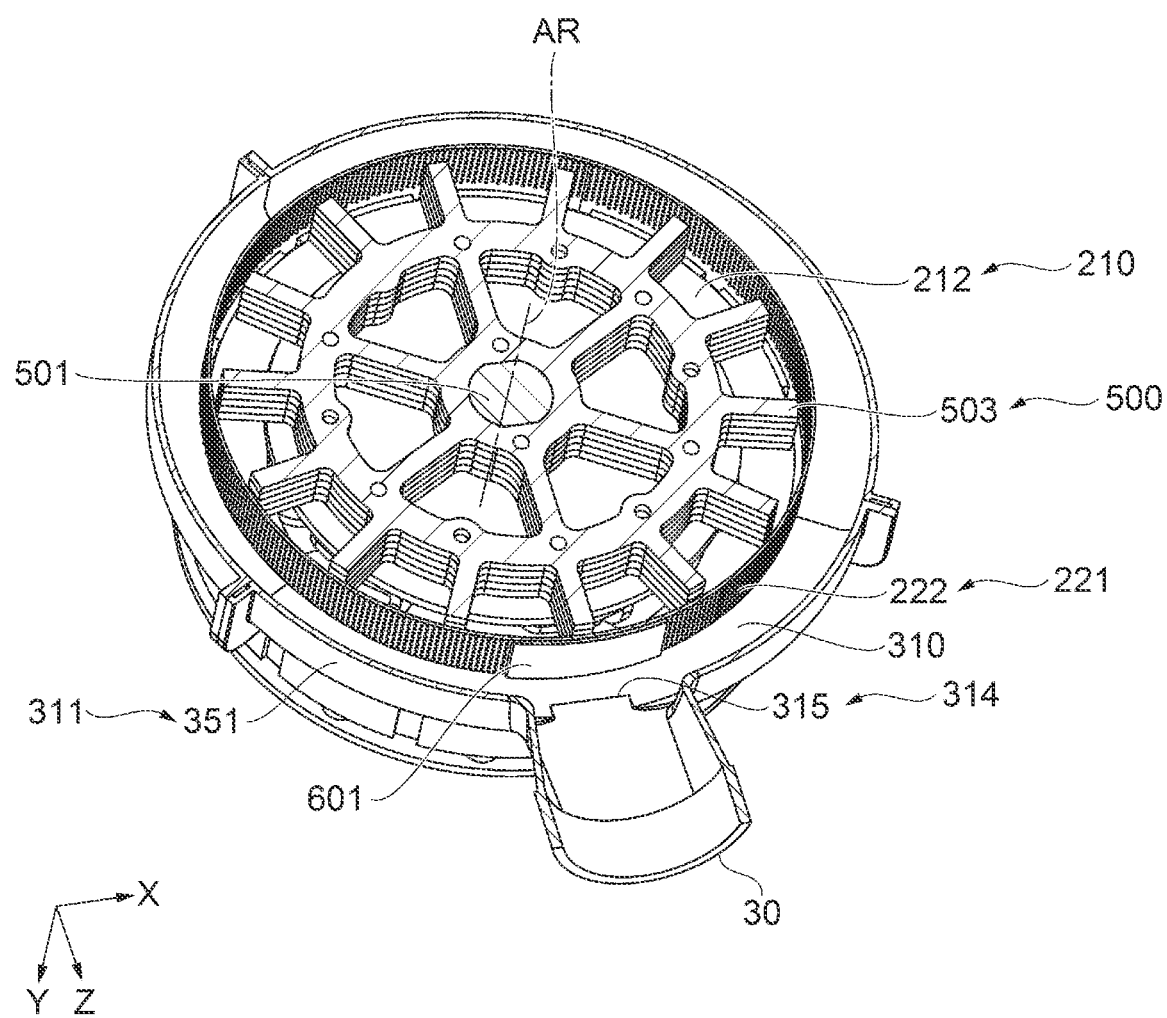
FIG. 13 is a cross sectional perspective view illustrating a periphery of a discharge unit.

As FIGS. 4, 10, and 12 illustrate, the side wall 212 has a disk shape. The side wall 212 is located on the +Y direction side of the fixing member 211. The side wall 212 is fixed to the fixing member 211 so as to define an inner surface on the +Y direction side of the defibrating chamber 210. The side wall 212 is provided with the supporting portion 401, the supply pipe 20, and a supply unit 214.

The supporting portion 401 is located at the center of the side wall 212. The supporting portion 401 is located on the +Y direction side from the rotary blades 503 of the rotor 500. The supporting portion 401 supports the rotation shaft 501 of the rotor 500 such that the rotor 500 can rotate around the axis center AR as the rotation center. The supporting portion 401 supports the +Y direction side of the rotation shaft 501 of the rotor 500 from the rotary blades 503.

The rotation shaft 501 is driven and rotated by a driving mechanism (not illustrated). In the present embodiment, the driving mechanism is configured by a belt and a pulley, power is transmitted from a rotary driving source (not illustrated) to the belt and pulley, and the rotor 500 rotates round the axis center AR as the rotation center. In the present embodiment, in FIG. 11, the rotor 500 rotates counterclockwise around the axis center AR as the rotation center, but the rotor 500 may rotate clockwise. Alternatively, in FIG. 11, the rotor 500 may rotates in both directions of clockwise and counterclockwise around the axis center AR as the rotation center. In addition, the configuration that drives and rotates the rotation shaft 501 does not have to be a configuration using a belt or a pulley.

The supply pipe 20 supplies the material MA containing a fiber to the defibrating chamber 210. FIGS. 4, 6, and 12 illustrate, the supply pipe 20 has a pipe shape. The supply pipe 20 is provided on a surface of the side wall 212 on the +Y direction side. The supply pipe 20 is provided, on the side wall 212, at a position in the −Z direction of the axis center AR of the rotation shaft 501. The supply pipe 20 extends in the Y-axis direction. The supply unit 214 is a through-hole having a round shape that penetrates the side wall 212 in the Y-axis direction. The supply unit 214 causes the supply pipe 20 to be in communication with the defibrating chamber 210. Therefore, the supply unit 214 opens, on the side wall 212, at a position in the −Z direction vertically above the rotation shaft 501. In other words, the supply unit 214 opens at a position, on the side wall 212, away from a discharge unit 314 described later, compared to the axis center AR.

As FIGS. 4, 6, and 10 illustrate, the side wall 213 has a disk shape. The side wall 213 is located on the −Y direction side of the fixing member 211. In addition, the side wall 213 is located on the −Y direction side of the rotary blades 503 of the rotor 500. The side wall 213 is fixed to the fixing member 211 through the screen 221 so as to define an inner surface on the −Y direction side of the defibrating chamber 210. The side wall 213 is provided with the supporting portion 402 that supports the −Y direction side, from the rotary blades 503, of the rotation shaft 501 of the rotor 500.

As FIGS. 4, 6 to 9, and 11 to 14 illustrate, the screen 221 has a thin plate shape. The screen 221 is located between the fixing member 211 and the side wall 213 in the Y-axis direction. The screen 221 is fixed to the fixing member 211 and the side wall 213 so as to be formed into an annular shape. The screen 221 is provided in the radial direction RR while being spaced from the rotary blades 503.

The dimension in the Y-axis direction, which is the width direction, of the screen 221 is larger than the dimension of each rotary blade 503 in the Y-axis direction. In the Y-axis direction, a tip of the rotary blade 503 is located within the width of the screen 221. The screen 221 is fixed to the fixing member 211 and the side wall 213 so as to define the inner peripheral surface of the defibrating chamber 210 having a cylindrical shape. The screen 221 defines a region, of the inner peripheral surface of the defibrating chamber 210, facing the tip of the rotary blade 503. The screen 221 is an example of an annular wall.

Figure 8:
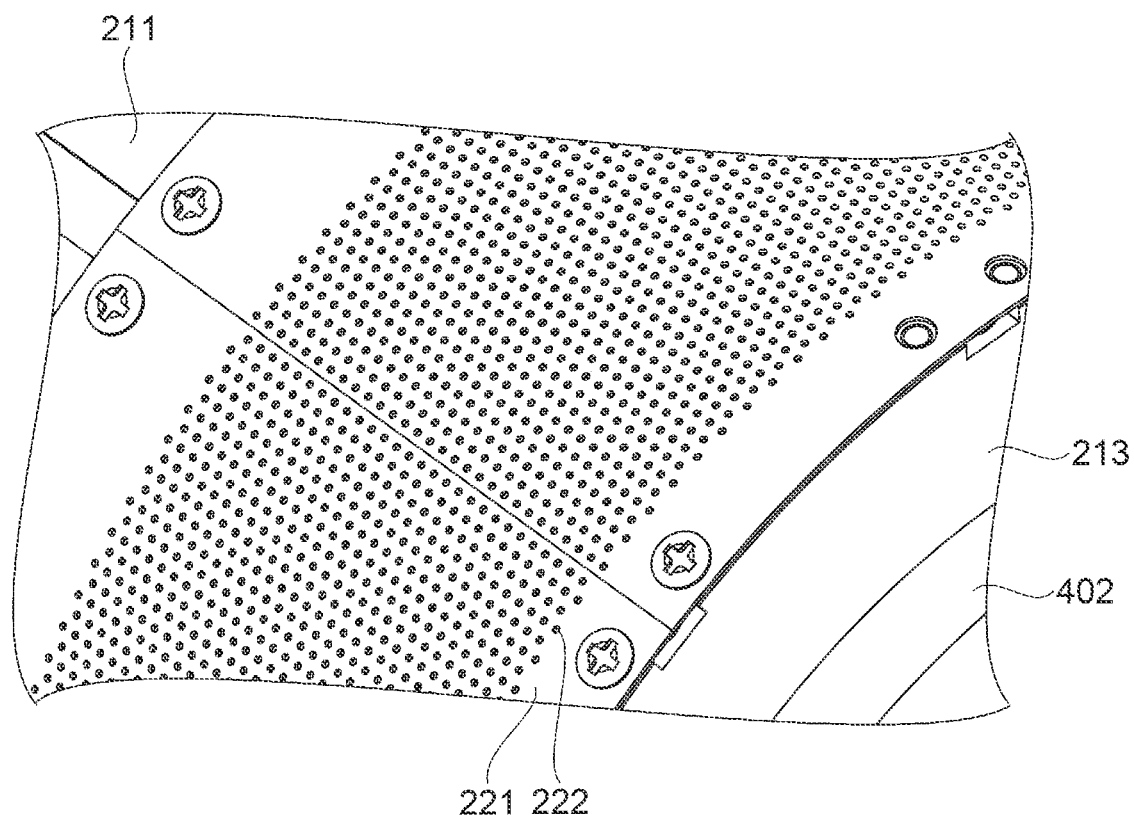
FIG. 8 is an enlarged view of a portion VIII illustrated in FIG. 7.
Figure 9:
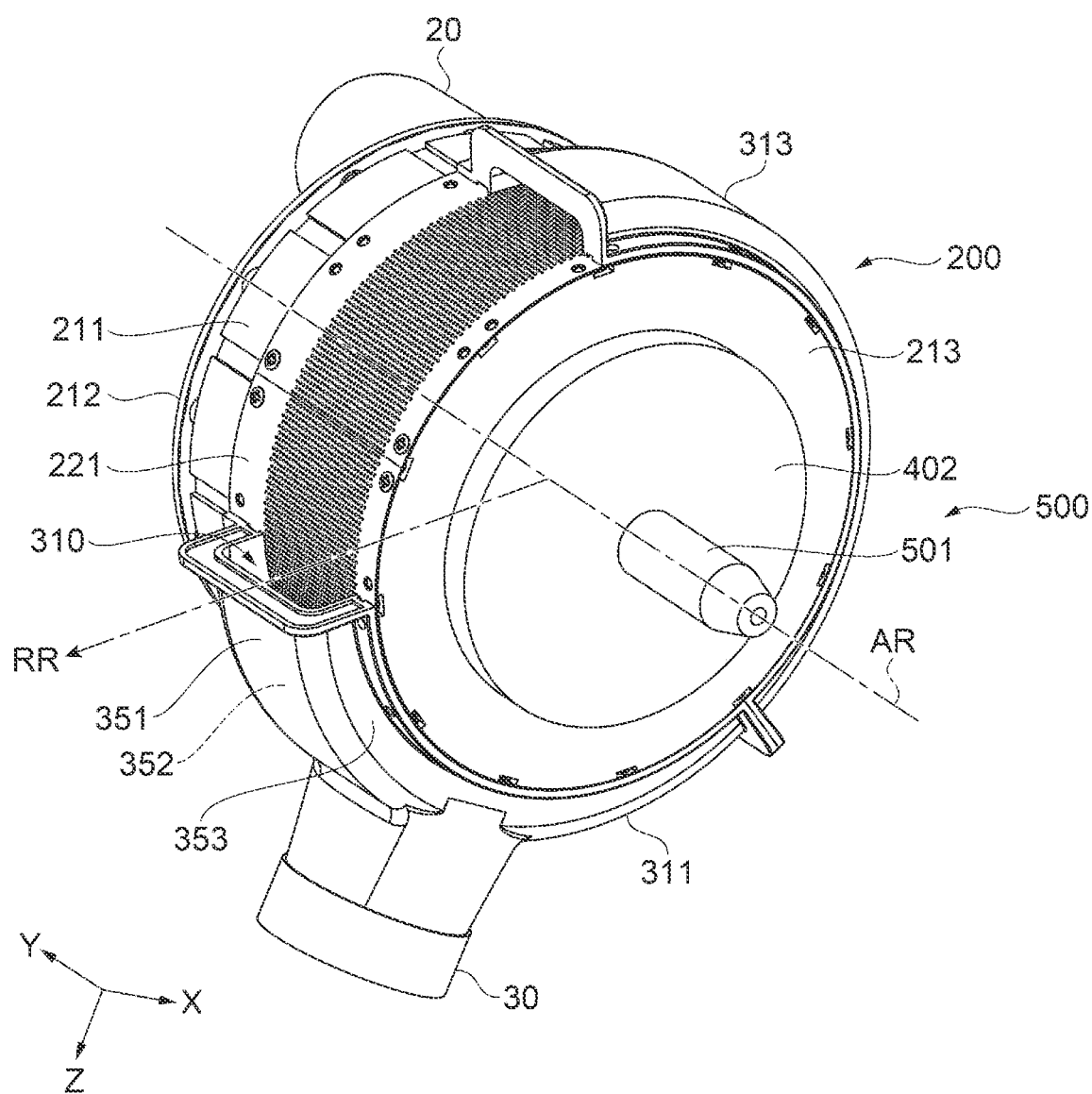
FIG. 9 is a perspective view illustrating the defibrating apparatus excluding a part of a housing.

The screen 221 is constituted by, for example, a thin plate member made of metal. The screen 221 of the present embodiment is formed into an annular shape by being fixed to the fixing member 211 and the side wall 213 such that a plurality of thin plate members is arranged in the circumferential direction CR. As the material made of metal, for example, stainless steel can be adopted. As illustrated in FIG. 8, a plurality of through-holes 222 that penetrates the screen 221 in a thickness direction is formed in the screen 221.

In the present embodiment, the plurality of through-holes 222 has the same shape. Each of the through-holes 222 of the present embodiment is a circular hole. The hole diameter of the through-hole 222 is set to be a size that allows a defibrated product that has been defibrated to a desired degree to pass. Note that the opening shape of the through-hole 222 does not have to be a circular shape, and may be a rectangular or polygonal shape. The screen 221 may be formed by forming the through-hole 222 by punching, etching, cutting, and the like on a thin plate member. Note that the screen 221 may be configured by a single thin plate member.

Figure 7:
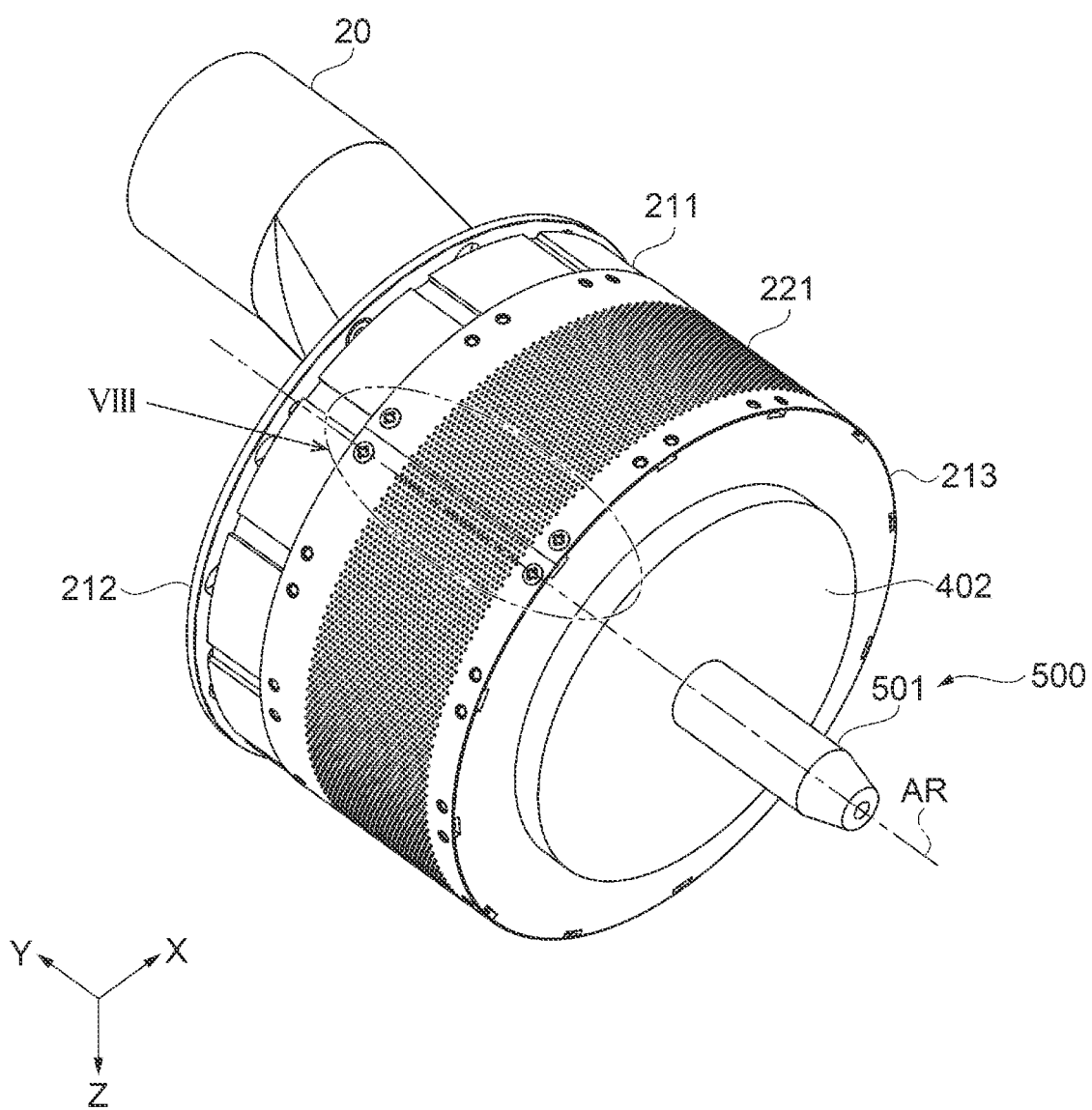
FIG. 7 is a perspective view illustrating the defibrating chamber.
Figure 11:
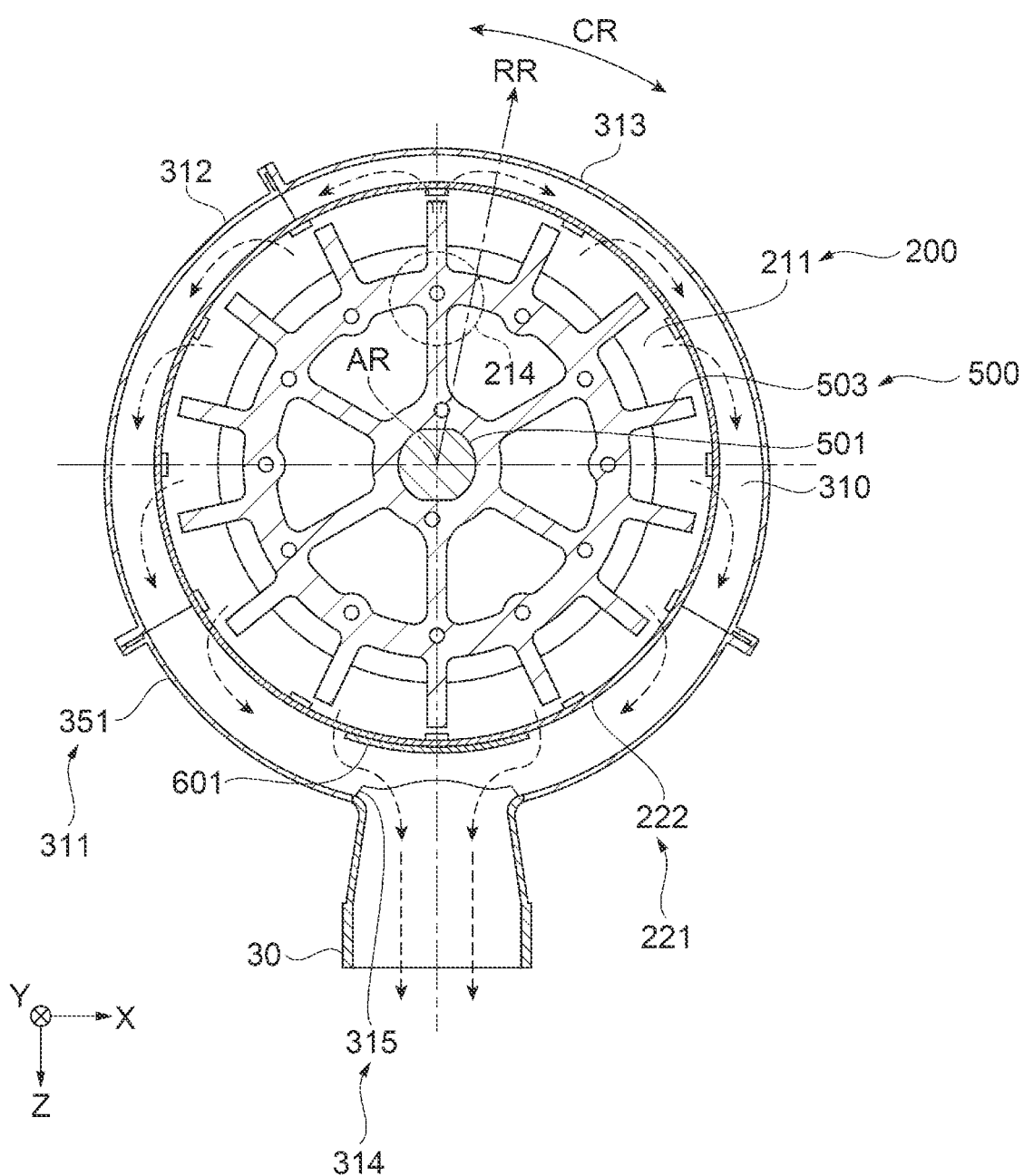
FIG. 11 is a sectional view illustrating an XI-XI cross section illustrated in FIG. 2.

As FIGS. 7, 8, and 11 illustrate, the plurality of through-holes 222 is provided so as to be distributed in the circumferential direction CR of the screen 221. In the present embodiment, through-hole columns, in which the through-holes 222 are arranged in the Y-axis direction, are provided over the entire periphery of the screen 221 at the same intervals in the circumferential direction CR. The opening diameter of each through-hole 222 is preferably 0.3 mm or more and 2.0 mm or less, and the opening diameter of the through-hole 222 in the present embodiment is 0.6 mm. In addition, the dimension of the residual portion of the screen 221, which is the shortest distance between openings of the through-holes 222, is preferably half to two times the opening diameter of each through-hole 222, and the dimension of the residual portion of the present embodiment is 0.4 mm. Therefore, in the present embodiment, the plurality of through-holes 222 is provided in the screen 221 in so-called zigzag such that positions of the through-holes 222 that form the through-hole columns adjacent to each other in the circumferential direction CR are shifted from each other in the Y-axis direction.

Alternatively, the plurality of through-holes 222 may be provided over the entire periphery of the screen 221 such that the through-hole columns, in which the through-holes 222 are arranged in the Y-axis direction, are located at several different intervals in the circumferential direction CR. Alternatively, the through-holes 222 may be provided over the entire periphery of the screen 221 such that through-hole groups, in which the through-holes 222 are arranged in the Y-axis direction and the circumferential direction CR, are located at the same intervals in the circumferential direction CR. In addition, in the present embodiment, the same number of the through-holes 222 is arranged in the Y-axis direction to form the through-hole columns, but the number of through-holes 222 that forms the through-hole columns may be different among the through-hole columns.

When the through-holes 222 are formed in a thin plate member by etching, as a material for the thin plate member, for example, SUS430, SUS304, SUS316L, and the like can be adopted. Alternatively, the screen 221 may be a mesh member configured by woven wires. In this case, meshes of the mesh member correspond to the through-holes 222.

As FIGS. 4 and 9 to 14 illustrate, the housings 311, 312, and 313 are provided so as to surround the outer side of the screen 221 in the circumferential direction CR. The housings 311, 312, and 313 form the discharge path 310 by covering the entire periphery of the outer side of the screen 221 in the circumferential direction CR. The housings 311, 312, and 313 are fixed to the fixing member 211 and the side wall 213 across the screen 221. The housings 311, 312, and 313 have an outer peripheral wall 351, a side wall 352 and a side wall 353. The outer peripheral wall 351 is provided in the radial direction RR at an interval W between the screen 221 and the outer peripheral wall 351. The outer peripheral wall 351 has an annular shape. The interval W between the outer peripheral wall 351 and the screen 221 is an inner dimension of the discharge path 310 in the radial direction RR.

The outer peripheral wall 351 defines the inner peripheral surface of the discharge path 310. The side wall 352 is located on the +Y direction side of the outer peripheral wall 351 and defines the inner surface of the discharge path 310 on the +Y direction side. The side wall 353 is located on the −Y direction side of the side wall 352 and defines the inner surface of the discharge path 310 on the −Y direction side. In addition, an interval D between the side wall 352 and the side wall 353 in the Y-axis direction is an inner dimension of the discharge path 310 in the Y-axis direction. The discharge path 310 of the present embodiment is formed into an annular shape while the three housings of the housings 311, 312, and 313 are fixed to the fixing member 211 and the side wall 213 across the screen 221 so as to be arranged in the circumferential direction CR.

As FIGS. 4 and 11 to 14 illustrate, the discharge path 310 is provided outside the screen 221 over the entire periphery in the circumferential direction CR. The discharge path 310 extends in the circumferential direction CR of the screen 221. The discharge path 310 is in communication with the defibrating chamber 210 through the plurality of through-holes 222 provided in the screen 221. The defibrated product formed in the defibrating chamber 210 is discharged to the discharge path 310 through the plurality of through-holes 222. Note that the discharge path 310 may be formed by one housing member.

The outer peripheral wall 351 of the housing 311 is provided with the discharge pipe 30 and the discharge unit 314. The discharge pipe 30 is provided on the +Z direction side of the outer peripheral wall 351 of the housing 311. The discharge pipe 30 is located on the +Z direction side, which is vertically below the axis center AR of the rotation shaft 501. Therefore, the discharge pipe 30 is provided at the lowermost position of the outer peripheral wall 351. The discharge pipe 30 has a pipe shape. The discharge pipe 30 extends in the +Z direction from the outer peripheral wall 351.

The discharge unit 314 is a through-hole that penetrates the outer peripheral wall 351 in the Z-axis direction. The discharge unit 314 has a substantially square shape when viewed from the Z-axis direction. An opening edge 315 is an edge of the opening of the discharge unit 314 on the discharge path 310 side. The dimension of the opening edge 315 in the Y-axis direction is the same as the inner dimension of the discharge path 310 in the Y-axis direction. The dimension of the opening edge 315 in the X-axis direction is set to 40 mm to 50 mm. The dimension of the discharge unit 314 in the Y-axis direction is the same as the inner dimension of the discharge path 310 in the Y-axis direction.

The discharge unit 314 causes the discharge path 310 to be in communication with the discharge pipe 30. The discharge unit 314 is provided in the outer peripheral wall 351 and opens toward the screen 221. Accordingly, the discharge unit 314 is provided at a position, of the outer peripheral wall 351, in the +Z direction, which is vertically below the axis center AR of the rotation shaft 501. In other words, the discharge unit 314 is provided at the lowermost position of the outer peripheral wall 351.

In the present embodiment, the interval D between the side wall 352 and the side wall 353 is the same over the entire periphery of the screen 221. The interval D is set to a prescribed dimension of 40 mm to 50 mm, for example. On the other hand, the interval W between the outer peripheral wall 351 and the screen 221 is narrower in a region away from a facing region that the discharge unit 314 faces, in the circumferential direction CR of the screen 221, than in the facing region that the discharge unit 314 faces.

Figure 14:
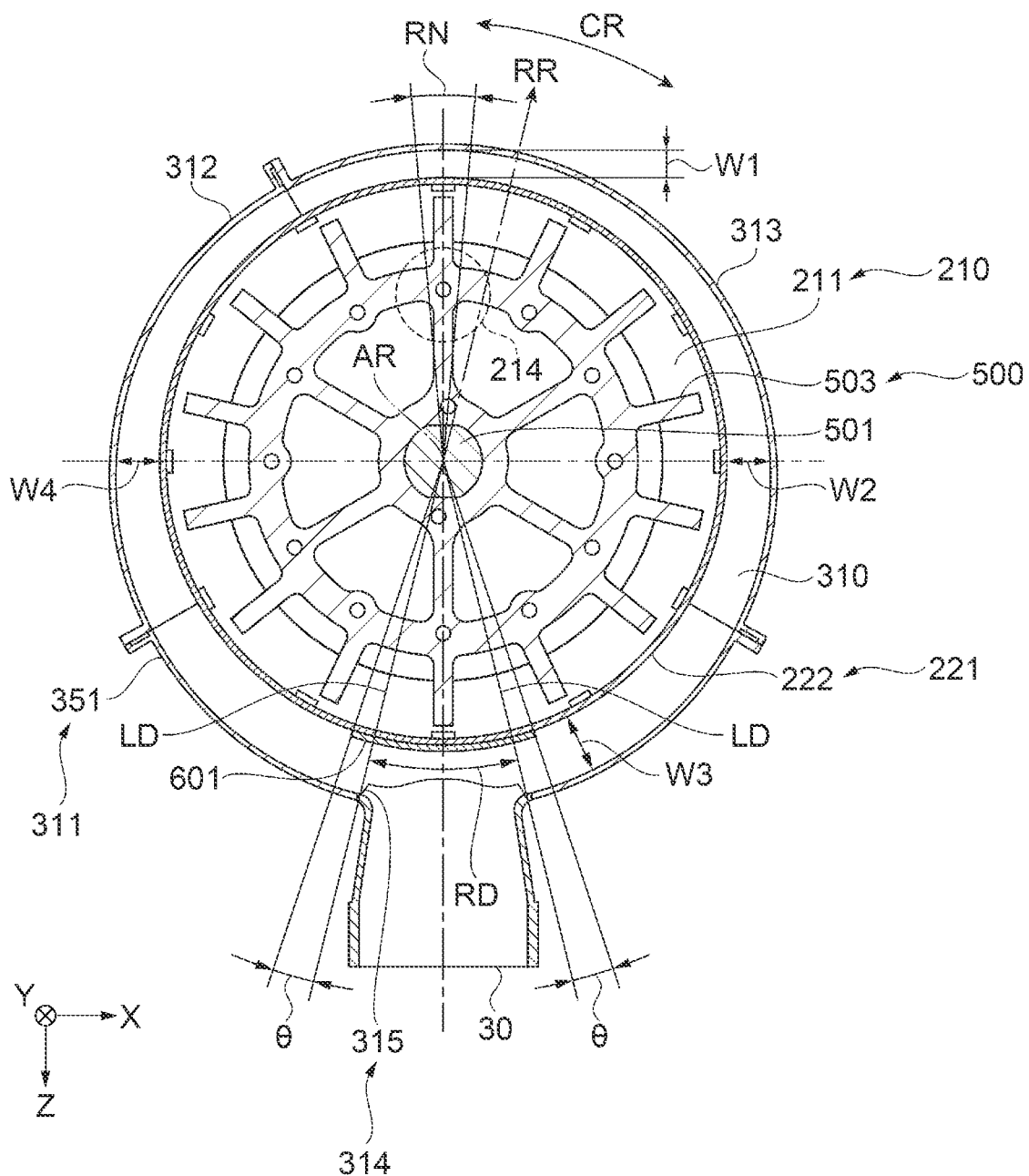
FIG. 14 is a cross view illustrating specifications of a discharge path and the discharge unit.

For example, as FIG. 14 illustrates, in the discharge path 310, the interval W of a region located in the −Z direction of the axis center AR is an interval W1, the interval W of a region located in the +X direction of the axis center AR is an interval W2, the interval W of a region located in the +Z direction of the axis center AR is an interval W3, and the interval W of a region located in the −X direction of the axis center AR is an interval W4. At this time, the interval W1 is narrower than the interval W3. In addition, the interval W2 and the interval W4 are narrower than the interval W3. In addition, the interval W1 is narrower than the interval W2 and the interval W4. Note that in the present embodiment, the interval W2 and the interval W4 are the same.

In addition, in the present embodiment, the interval W gradually decreases with the increase of the distance from the discharge unit 314 in the circumferential direction CR on the screen 221. In addition, the interval D between the side wall 352 and the side wall 353 is the same over the entire periphery of the screen 221. Therefore, the flow path cross section of the discharge path 310 decreases with the increase of the distance from the discharge unit 314 in the circumferential direction CR on the screen 221. In addition, in the present embodiment, for example, the interval W1 is set to 5 mm, the interval W2 and the interval W4 are set to 10 mm, and the interval W3 is set to 15 mm.

As FIGS. 4, and 11 to 14 illustrate, the closing member 601 is provided on the outer peripheral surface side, which is the discharge path 310 side, of the screen 221. The closing member 601 is provided in the facing region that discharge unit 314 faces, of the screen 221. The closing member 601 is located in the +Z direction of the axis center AR. The closing member 601 closes openings of the through-holes 222 on the discharge path 310 side by covering the outer peripheral surface of the screen 221 on the discharge path 310 side. The closing member 601 closes the through-holes 222 provided in a region near the discharge unit 314, on the screen 221. Note that the closing member 601 may be provided on the inner peripheral surface side, which is the defibrating chamber 210 side, of the screen 221. In this case, the closing member 601 closes openings of the through-holes 222 on the defibrating chamber 210 side by covering the inner peripheral surface, which is on the defibrating chamber 210 side, of the screen 221.

In the present embodiment, the dimension of the closing member 601 in the Y-axis direction is the same as the discharge path 310 in the Y-axis direction. The dimension of the closing member 601 in the X-axis direction is larger than the dimension of the opening edge 315 in the discharge unit 314 in the X-axis direction.

In addition, as FIG. 14 illustrates, an angle θ is formed between a line segment connecting the axis center AR and an end of the closing member 601 in the +X direction and a line segment connecting the axis center AR and an end of the opening edge 315 in the +X direction. In addition, the angle θ is formed between a line segment connecting the axis center AR and an end of the closing member 601 in the −X direction and a line segment connecting the axis center AR and an end of the opening edge 315 in the −X direction. Accordingly, the position of the end of the closing member 601 in the +X direction is located on the +X direction side by the angle θ with respect to the position of the end of the opening edge 315 in the +X direction. Moreover, the position of the end of the closing member 601 in the −X direction is located on the −X direction side by the angle θ with respect to the position of the end of the opening edge 315 in the −X direction. In the present embodiment, the angle θ is set to, for example, 5° to 15°

On the screen 221, the through-holes 222 provided in a region whose outer peripheral surface is covered by the closing member 601 does not cause the defibrating chamber 210 to be in communication with the discharge path 310. In other words, on the screen 221, in the region whose outer peripheral surface is covered by the closing member 601, the through-holes 222 that cause the defibrating chamber 210 to be in communication with the discharge path 310 are not provided. Moreover, in the present embodiment, on the screen 221, in the Z-axis direction, in the region between the center of the discharge unit 314 and the rotation shaft 501, the through-holes 222 that cause the defibrating chamber 210 to be in communication with the discharge path 310 are not provided.

In addition, while a line segment orthogonal to the axis center AR and connecting the axis center AR and the center of the discharge unit 314 is a projection line segment, and a direction extending along the projection line segment is a projection direction. When the opening edge 315 of the discharge unit 314 is projected on the screen 221, in the present embodiment, in a region surrounded by the opening edge 315 projected on the screen 221, the through-holes 222 that cause the defibrating chamber 210 to be in communication with the discharge path 310 are not provided. Note that in the present embodiment, the above-described projection direction extends in the Z-axis direction. In addition, the region surrounded by the opening edge 315 and projected on the screen 221 is an example of the facing region that the discharge unit 314 faces on the screen 221.

In addition, when a line segment orthogonal to the axis center AR and connecting the axis center AR and the opening edge 315 of the discharge unit 314 is a virtual line segment LD, a region, of the screen 221, surrounded by the virtual line segment LD is a region RD, and among the through-holes 222, the through-holes 222 that cause the defibrating chamber 210 to be in communication with the discharge path 310 are communication holes Ch, in the present embodiment, the communication holes Ch are not provided in the region RD. The region RD is an example of the facing region that the discharge unit 314 faces on the screen 221.

As a result, when a region other than the region RD is a region ERD (not illustrated), the number of the communication holes Ch provided per unit area is less in the region RD than in the region ERD. In addition, a region of the screen 221 where the interval W between the screen 221 and the outer peripheral wall 351 is the narrowest, which is the interval W1, is a region RN, and a region of the screen 221 other than the region RN is a region (ERN) (not illustrated), the number of the communication holes Ch provided per unit area is more in the region RN than in the region ERN.

In addition, the number of the communication holes Ch provided per unit area is more in the region RN than in the region RD. Note that in the present embodiment, the region RN and a region in the discharge path 310 where the interval W is the interval W1, which is the narrowest, are located in the −Z direction, which is vertically above the axis center AR. Therefore, the region RN is an example of the region farthest from the discharge unit 314, of the screen 221, in the circumferential direction CR.

Note that in the present embodiment, by covering the outer peripheral surface of the screen 221 with the closing member 601, a region where the through-holes 222 that cause the defibrating chamber 210 to be in communication with the discharge path 310 are not provided is formed on the screen 221. However, by not forming the through-holes 222 in the region, of the screen 221, whose outer peripheral surface is covered with the closing member 601, a region, where the through-holes 222 that cause the defibrating chamber 210 to be in communication with the discharge path 310 are not provided, may be formed on the screen 221.

Next, operation of the defibrating apparatus 200 will be described. The defibrating apparatus 200 leads the material MA to be supplied to the defibrating chamber 210 to a gap between the rotary blades 503 of the rotor 500 that are rotating and the screen 221 by an air flow and performs dry defibrating processing on the material MA.

In the present embodiment, as FIG. 4 illustrates, the material MA fed from the supply pipe 20 of the defibrating apparatus 200 is introduced to the defibrating chamber 210 through the supply unit 214. In the defibrating chamber 210, by the rotation shaft 501 being driven to rotate, the rotor 500 rotates. In addition, in the discharge path 310, negative pressure is applied by the suction unit 35 through the discharge pipe 30. As a result, in the defibrating chamber 210, the discharge path 310, and the discharge pipe 30, as the broken lines indicate in FIG. 4, an air flow is generated.

By the air flow, the material MA is sent to the gap between the tips of the rotary blades 503 and the screen 221. The material MA sent to the gap flies by receiving a centrifugal force from the rotor 500 and the like, collides with the screen 221, is unraveled and defibrated. This means that, in the defibrating chamber 210, the material MA is defibrated, and the defibrated product is produced.

The defibrated product produced in the defibrating chamber 210 passes through the through-holes 222 of the screen 221 by an air flow and enters the discharge path 310. The defibrated product that has entered the discharge path 310 moves to the discharge pipe 30 by an air flow through the discharge unit 314 and is discharged to the pipe 3 coupled to the discharge pipe 30. The air flow that moves the defibrated product is generated by a pressure difference between the negative pressure applied to the discharge pipe 30 by the suction unit 35 and pressure in the discharge unit 314, the discharge path 310, and the defibrating chamber 210 upstream of the discharge pipe 30. For example, the air flow that passes through the through-holes 222 of the screen 221 is generated by the pressure difference between the negative pressure from the suction unit 35 acting on the discharge path 310 and the pressure of the defibrating chamber 210.

In the discharge path 310, the negative pressure by the suction unit 35 tends to act on a region near the discharge unit 314. As a result, in the through-holes 222 provided in the region near the discharge unit 314, the flow rate of air passing toward the discharge path 310 from the defibrating chamber 210 tends to increase. In addition, in the through-holes 222 provided in the region near the discharge unit 314, the velocity of an air flow passing toward the discharge path 310 from the defibrating chamber 210 tends to increase. In this case, in the through-holes 222 provided in the region near the discharge unit 314, the defibrated product that has not been sufficiently defibrated may be discharged to the discharge path 310. In addition, the through-holes 222 may be clogged with the defibrated product.

In addition, in the through-holes 222 provided in the region near the discharge unit 314, when the flow rate of the air passing toward the discharge path 310 from the defibrating chamber 210 increases, the negative pressure by the suction unit 35 is unlikely to act on a region away from the discharge unit 314. As a result, in the through-holes 222 provided in the region away from the discharge unit 314, the velocity of the air flow passing toward the discharge path 310 from the defibrating chamber 210 tends to decrease. In the region where the velocity of the air flow passing through the through-holes 222 of the screen 221 is low, the defibrated product is unlikely to pass through the through-holes 222. As a result, the defibrated product that stays in the defibrating chamber 210 for a long time and is excessively defibrated increases.

Figure 15:
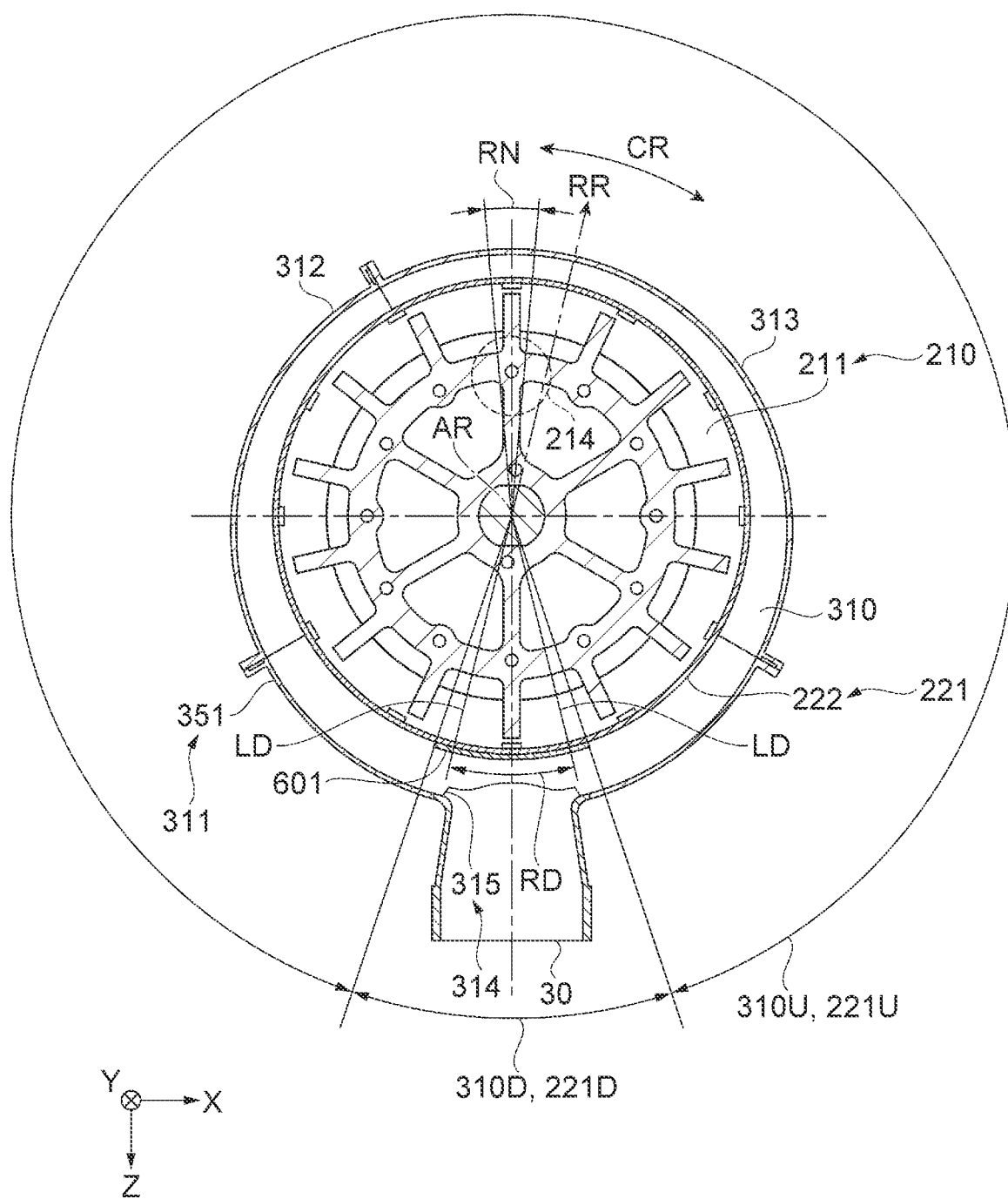
FIG. 15 is a sectional view illustrating specifications of the discharge path and the screen.

In the present embodiment, for example, as FIG. 15 illustrates, a region, of the discharge path 310, including the discharge unit 314 is a downstream discharge path 310D, which is a region near the discharge unit 314, and a region other than the downstream discharge path 310D is an upstream discharge path 310U, which is a region away from the discharge unit 314. In addition, a region, of the screen 221, constituting the downstream discharge path 310D is a downstream screen 221D, and a region constituting the upstream discharge path 310U is an upstream screen 221U. When the through-holes 222 that cause the defibrating chamber 210 to be in communication with the discharge path 310 are the communication holes Ch, the number of the communication holes Ch provided per unit area is less on the downstream screen 221D than on the upstream screen 221U.

In other words, the communication holes Ch are provided in the screen 221 such that, when the downstream screen 221D and the upstream screen 221U having the same area are compared with each other, the air is less likely to pass through the downstream screen 221D than the upstream screen 221U. Note that in the present embodiment, when the closing member 601 is provided, the downstream discharge path 310D is a region including the region RD, the closing member 601, and the discharge unit 314, and the upstream discharge path 310U is a region including the region RN and not including the closing member 601 and the discharge unit 314. In addition, the downstream screen 221D is an example of a downstream annular wall, and the upstream screen 221U is an example of an upstream annular wall.

According to this configuration, compared to the case where the number of the communication holes Ch provided per unit area is the same over the entire periphery of the screen 221, the flow rate of the air passing through the through-holes 222 on the downstream screen 221D toward the discharge path 310 from the defibrating chamber 210 can be reduced. In addition, the negative pressure by the suction unit 35 easily acts on the upstream discharge path 310U. Moreover, the velocity of the air flow passing through the through-holes 222 on the upstream screen 221U toward the discharge path 310 from the defibrating chamber 210 can be easily increased. As a result, discharge of the defibrated product that has not been sufficiently defibrated from the through-holes 222 of the downstream screen 221D to the discharge path 310 can be reduced. In addition, the defibrated product that has been excessively defibrated can be reduced.

In addition, a pressure difference between the pressure of the downstream discharge path 310D and the pressure of the upstream discharge path 310U can be easily reduced. In addition, a velocity difference between the velocity of the air flow passing through the through-holes 222 of the downstream screen 221D and the velocity of the air flow passing through the through-holes 222 of the upstream screen 221U can be easily reduced. Accordingly, defibration variation of the defibrated product discharged to the discharge path 310 can be reduced.

In addition, in the present embodiment, as FIG. 11 illustrates, the discharge path 310 is provided so as to cover the outer side of the screen 221 over the entire periphery. Moreover, the discharge unit 314 is provided in the outer peripheral wall 351 of the housings 311, 312, and 313 that form the discharge path 310 and opens toward the screen 221. As a result, in the discharge path 310, the negative pressure by the suction unit 35 can easily act on upstream away from the discharge unit 314. Therefore, on the screen 221, discharge of the defibrated product that has been excessively defibrated to a region away from the discharge unit 314 can be suppressed, and defibration variation of the defibrated product discharged to the discharge path 310 can be reduced.

In addition, as arrows of broken lines indicate in FIG. 11, in a region, of the discharge path 310, on the +X direction side from the axis center AR, clockwise air flows toward the discharge unit 314 can be generated, and in a region on the −X direction side from the axis center AR, counterclockwise air flows toward the discharge unit 314 can be generated. In addition, at this time, in a region, of the discharge path 310, farthest from the discharge unit 314 and located in the −Z direction, which is vertically above the axis center AR, a clockwise air flow toward the discharge unit 314 and a counterclockwise air flow toward the discharge unit 314 can be generated.

As described above, according to the defibrating apparatus 200 and the sheet manufacturing apparatus 100 according to the first embodiment, the following effects can be obtained.

The defibrating apparatus 200 includes the rotor 500 that rotates around the axis center AR of the rotation shaft 501 as a rotation center, the defibrating chamber 210 that accommodates the rotor 500 and in which a defibrated product is formed from the material MA containing a fiber by rotation of the rotor 500, the supply pipe 20 that supplies the material MA to the defibrating chamber 210, the discharge path 310 that is in communication with the defibrating chamber 210 and to which the defibrated product is discharged from the defibrating chamber 210, the discharge pipe 30 that discharges the defibrated product from the discharge path 310 by negative pressure being applied, the discharge unit 314 that causes the discharge path 310 to be in communication with the discharge pipe 30, the screen 221 having an annular shape that is provided and spaced from the rotor 500 in the radial direction RR of the rotor 500 and defines the defibrating chamber 210, the housings 311, 312, and 313 that form the discharge path 310 extending in the circumferential direction CR of the screen 221 by covering the outer side of the screen 221, the plurality of through-holes 222 that is provided in the screen 221 and causes the defibrating chamber 210 to be in communication with the discharge path 310, and the outer peripheral wall 351 that is included in the housings 311, 312, and 313 and provided at an interval from the screen 221 in the radial direction RR. In addition, the discharge unit 314 is provided in the housing 311. In addition, when a region, of the discharge path 310, including the discharge unit 314 is the downstream discharge path 310D, a region, of the discharge path 310, other than the downstream discharge path 310D is the upstream discharge path 310U, a region, of the screen 221, constituting the downstream discharge path 310D is the downstream screen 221D, a region of the screen 221, constituting the upstream discharge path 310U is the upstream screen 221U, and the through-holes 222 that cause the defibrating chamber 210 to be in communication with the discharge path 310 are the communication holes Ch, the communication holes Ch are provided in the screen 221 and, when the downstream screen 221D is compared with the upstream screen 221U having the same area as the downstream screen 221D, air is less likely to pass through the downstream screen 221D than the upstream screen 221U. According to this configuration, compared to the case where the number of the communication holes Ch provided per unit area is the same over the entire periphery of the screen 221, the flow rate of the air passing through the through-holes 222 of the downstream screen 221D toward the discharge path 310 from the defibrating chamber 210 can be reduced. In addition, the negative pressure by the suction unit 35 easily acts on the upstream discharge path 310U. Moreover, the velocity of the air flow passing through the through-holes 222 of the upstream screen 221U toward the discharge path 310 from the defibrating chamber 210 can be easily increased. As a result, discharge of the defibrated product that has not been sufficiently defibrated from the through-holes 222 of the downstream screen 221D to the discharge path 310 can be reduced. In addition, the defibrated product that has been excessively defibrated can be reduced.

The plurality of through-holes 222 has the same shape, and the number of the communication holes Ch provided per unit area is less on the downstream screen 221D than on the upstream screen 221U. According to this configuration, compared to the case where the number of the communication holes Ch provided per unit area is the same over the entire periphery of the screen 221, the flow rate of the air passing through the through-holes 222 of the downstream screen 221D toward the discharge path 310 from the defibrating chamber 210 can be reduced.

The plurality of through-holes 222 has the same shape, the discharge unit 314 faces the screen 221, the downstream screen 221D includes the region RD that the discharge unit 314 faces, the number of the communication holes Ch provided per unit area is more in the region RN, of the screen 221, than in the region RD. According to this configuration, in the region RN of the screen 221, the velocity of the air flow passing through the through-holes 222 can be easily increased. Therefore, in the defibrating chamber 210, formation of the excessively defibrated product can be reduced, and defibration variation of the defibrated product to be discharged to the discharge path 310 can be reduced. In addition, in the defibrating chamber 210, the through-holes 222 of the screen 221, and the discharge path 310, an air flow that discharges the defibrated product toward downstream of the discharge path 310 can be ensured, and remaining of the defibrated product can be suppressed.

On the screen 221, the communication holes Ch are not provided in the region RD. According to this configuration, compared to the case where the number of the communication holes Ch provided per unit area is the same over the entire periphery of the screen 221, the flow rate of the air passing through the through-holes 222 of the downstream screen 221D toward the discharge path 310 from the defibrating chamber 210 can be reduced. Accordingly, the negative pressure by the suction unit 35 can easily act on upstream, of the discharge path 310, away from the discharge unit 314. As a result, in the defibrating chamber 210 and the discharge path 310, an air flow that discharges the defibrated product toward downstream of the discharge path 310 can be ensured, and remaining of the defibrated product can be suppressed. In addition, compared to the case where the communication holes Ch are provided in the region RD, defibration variation caused by an increase of the defibrated product that has not been defibrated can be reduced.

The defibrating apparatus 200 further includes the closing member 601 in the region RD, and the closing member 601 closes openings of the through-holes 222 by covering the screen 221. According to this configuration, the communication between the defibrating chamber 210 and the discharge path 310 by the through-holes 222 can be blocked. Therefore, the number of the communication holes Ch provided in the screen 221 can be changed, and a region where the number of the communication holes Ch is less can be formed on the screen 221.

The closing member 601 is provided on the outer peripheral surface, which is a surface on the discharge path 310 side, of the screen 221 and closes openings of the through-holes 222 on the outer peripheral surface side. According to this configuration, without changing the gap between the screen 221 and the rotor 500, a region where the number of the communication holes Ch is less can be formed on the screen 221.

The housings 311, 312, and 313 form the discharge path 310 by surrounding the outer side of the screen 221 in the circumferential direction CR. According to this configuration, since the discharge path 310 is provided over the entire periphery of the outer side of the screen 221, the through-holes 222 can be provided over the entire periphery of the screen 221. Therefore, the defibrated product of the defibrating chamber 210 is easily discharged to the discharge path 310.

The interval between the outer peripheral wall 351 and the screen 221 is narrower in a region, of the discharge path 310, away from the downstream discharge path 310D in the circumferential direction CR than in the downstream discharge path 310D. According to this configuration, the average velocity of the air flow in the region, of the discharge path 310, away from the discharge unit 314 can be easily increased. In addition, on the flow path cross section of the discharge path 310, the central region where the velocity of the air flow is the highest can be brought close to the screen 221. Therefore, in the discharge path 310, remaining of the defibrated product can be suppressed.

The rotor 500 is accommodated in the defibrating chamber 210 and the axis center AR intersects with the vertical direction, and the discharge unit 314 is provided at the lowermost position of the outer peripheral wall 351. According to this configuration, the gravity acting on the defibrated product can act, as a force toward the discharge unit 314, on the defibrated product to be discharged to the discharge path 310. Therefore, from the discharge path 310 to the discharge pipe 30, the defibrated product in the discharge path 310 can be effectively discharged.

The sheet manufacturing apparatus 100 includes the defibrating apparatus 200, the second web forming unit 70 that forms the second web Wb2 by causing the defibrated product discharged from the discharge pipe 30 to accumulate, and the sheet forming unit 80 that forms the sheet S containing fibers by binding the fibers contained in the second web Wb2. According to this configuration, the sheet manufacturing apparatus 100 can form the sheet S from the defibrated product formed in the defibrating apparatus 200.

The defibrating apparatus 200 and the sheet manufacturing apparatus 100 according to the above-described embodiment of the present disclosure basically have the above-described configurations, but needless to say, the configurations can be partially changed and omitted within the scope not departing from the gist of the present disclosure. In addition, the above-described embodiment and other embodiments described below can be implemented in combination with each other as long as they are not technically contradictory to each other. Hereinafter, other embodiments will be described.

In the above-described embodiment, the plurality of through-holes 222 has the same shape, the through-holes 222 may be provided in the screen 221 such that the number of the communication holes Ch provided per unit area, on the screen 221, gradually increases with the increase of the distance from the discharge unit 314 in the circumferential direction CR. In this case, for example, through-hole columns in which the same number of the through-holes 222 is arranged in the Y-axis direction may be provided in the screen 221 such that the interval between the through-hole columns decreases with the increase of the distance from the discharge unit 314 in the circumferential direction CR. In addition, for example, the through-hole columns in which the through-holes 222 are arranged in the Y-axis direction are provided in the screen 221 at the same interval in the circumferential direction CR, and the number of the through-holes 222 that form the through-hole columns may be increased with the increase of the distance from the discharge unit 314 in the circumferential direction CR. According to this configuration, the negative pressure by the suction unit 35 can easily act on upstream of the discharge path 310 away from the discharge unit 314. In addition, the velocity difference of the velocity of the air flow passing through the plurality of through-holes 222 provided in the screen 221 can be easily reduced. Therefore, the defibration variation of the defibrated product discharged to the discharge path 310 can be reduced.

In the above-described embodiment, the discharge unit 314 does not have to be provided in the outer peripheral wall 351. For example, the discharge unit 314 may be provided in either one of the side wall 353 and the side wall 352 of the housing 311. In addition, for example, when the discharge unit 314 is provided in the side wall 353, the discharge unit 314 may face the screen 221, or may face the side wall 352 and does not have to face the screen 221. In this case, the closing member 601 is provided in a region, of the downstream screen 221D, that the discharge unit 314 does not face. This means that the closing member 601 closes the openings of the through-holes 222 by covering the downstream screen 221D. In addition, the closing member 601 is provided on the outer peripheral surface, which is a surface on the discharge path 310 side of the downstream screen 221D and closes the openings of the through-holes 222 on the outer peripheral surface side. According to this configuration, the communication between the defibrating chamber 210 and the discharge path 310 by the through-holes 222 can be blocked. Therefore, the number of the communication holes Ch provided in the downstream screen 221D can be changed, and a region where the number of the communication holes Ch is less can be formed on the downstream screen 221D. In this case, the plurality of through-holes 222 provided in the screen 221 does not have the same shape.

In the above-described embodiment, the defibrating apparatus 200 does not have to be disposed in the sheet manufacturing apparatus 100 while being oriented such that the axis center AR is horizontal. In this case, on the condition that the discharge unit 314 is located at the lowermost position on the outer peripheral wall 351, the defibrating apparatus 200 may be disposed in the sheet manufacturing apparatus 100 while being tilted such that the axis center AR intersects with the horizontal direction.

In the above-described embodiment, the defibrating apparatus 200 does not have to be disposed in the sheet manufacturing apparatus 100 while being oriented such that the discharge unit 314 and the discharge pipe 30 are vertically below the axis center AR. For example, the defibrating apparatus 200 may be disposed in the sheet manufacturing apparatus 100 while being oriented such that the discharge unit 314 and the discharge pipe 30 are vertically above the axis center AR. Moreover, for example, the defibrating apparatus 200 may be disposed in the sheet manufacturing apparatus 100 while being oriented so that the discharge unit 314 and the discharge pipe 30 are arranged side by side with the axis center AR in the horizontal direction.

In the above-described embodiment, the interval W between the outer peripheral wall 351 and the screen 221 may become gradually narrower with the increase of the distance from the discharge unit 314 in the circumferential direction CR. For example, in the discharge path 310, when the interval W of a region located in the −Z direction of the axis center AR is the interval W1, and the interval W of a region located in the +Z direction of the axis center AR is the interval W3, which is wider than the interval W1, the interval W connecting the space between the region located in the −Z direction of the axis center AR and the region located in the +Z direction of the axis center AR, in the discharge path 310, may become gradually narrower toward the region located in the −Z direction of the axis center AR from the region located in the +Z direction of the axis center AR. Alternatively, in the discharge path 310, the interval W connecting the space between the region located in the −Z direction of the axis center AR and the region located in the +Z direction of the axis center AR may be an interval narrower than the interval W3 and wider than the interval W1.

In the above-described embodiment, as FIG. 14 illustrates, when the discharge path 310 is viewed from the −Y direction side, on the condition that in the discharge path 310, in a region on the +X direction side of the discharge unit 314, clockwise air flows toward the discharge unit 314 are generated, and in a region on the −X direction side of the discharge unit 314, counterclockwise air flows toward the discharge unit 314 are generated, the discharge path 310 does not have to be symmetrical. In this case, for example, the interval W2 and the interval W4 may be different from each other, and the region in which the interval W is the narrowest may be shifted in the X-axis direction from a position in the −Z direction of the axis center AR. In addition, for example, the interval D between the side wall 352 and the side wall 353 may be different between in a region on the +X direction side of the discharge unit 314 and in a region on the −X direction side of the discharge unit 314.

In the above-described embodiment, on the inner peripheral surface of the screen 221, a fixed blade may be provided in a region facing each rotary blade 503. The fixed blade defibrates the material MA led between the fixed blade and the rotary blade 503. In this case, the fixed blade may be fixed to the inner peripheral surface of the screen 221 with a gap from the tip of the rotary blade 503. As FIG. 14 illustrates, when the screen 221 is viewed from the −Y direction side, the fixed blade may have a pointed shape projecting toward the rotary blade 503 from the screen 221 and a shape extending in the Y-axis direction. When a plurality of fixed blades is provided, the plurality of fixed blades may be provided over the entire periphery of the screen 221 at intervals in the circumferential direction CR. Alternatively, the fixed blades are provided in a region, of the inner peripheral surface of the screen 221, which is a surface on the opposite side of the outer peripheral surface where the closing member 601 is provided.

In the above-described embodiment, the supply unit 214 does not have to have a round shape as long as the supply unit 214 is a through-hole that penetrates the side wall 212 in the Y-axis direction. For example, the supply unit 214 may have a polygonal shape or an oval shape, or a circular arc shape with the axis center AR as a center.

In the above-described embodiment, the supply unit 214 does not have to open at a position, on the side wall 212, vertically above the axis center AR. For example, the supply unit 214 may open at a position, on the side wall 212, arranged side by side with the axis center AR in the horizontal direction.

In the above-described embodiment, the discharge unit 314 does not have to have a round shape when viewed from the Z-axis direction. In addition, the dimension of the opening edge 315 in the Y-axis direction does not have to be the same as the inner dimension of the discharge path 310 in the Y-axis direction. In this case, for example, the dimension of the opening edge 315 in the Y-axis direction may be smaller than the inner dimension of the discharge path 310 in the Y-axis direction.

In the above-described embodiment, the dimension of the closing member 601 in the Y-axis direction does not have to be the same as the dimension of the discharge path 310 in the Y-axis direction. For example, the dimension of the closing member 601 in the Y-axis direction may be smaller than the dimension of the discharge path 310 in the Y-axis direction. In addition, the dimension of the closing member 601 in the X-axis direction may be the same as the dimension of the opening edge 315 in the discharge unit 314 in the X-axis direction, or may be smaller. In addition, the closing member 601 does not have to have a rectangular shape. For example, the closing member 601 may have a round shape or an oval shape.

In the above-described embodiment, the defibrating apparatus 200 does not have to be provided with the closing member 601. In this case, on the screen 221, the through-holes 222 may be provided in the region RD such that the number of the through-holes 222 provided per unit area is less than in the region ERD. Alternatively, by providing the above-described fixed blades on the inner peripheral surface of the screen 221 corresponding to the region RD, the number of the communication holes Ch may be made less in the region RD than the in region ERD. In this case, the fixed blades are provided on the inner peripheral surface of the screen 221, which is a surface on the defibrating chamber 210 side and can be considered as an example of a closing member that closes openings of the through-holes 222 on the inner peripheral surface side.

In the above-described embodiment, the housings 311, 312, and 313 do not have to cover the outer side of the screen 221 over the entire periphery in the circumferential direction CR. In addition, the discharge path 310 does not have to be provided on the outer side of the screen 221 over the entire periphery in the circumferential direction CR. For example, in the above-described embodiment, the discharge path 310 may be a region between the outer side of the screen 221 partially covered by the housing 311 and the outer peripheral wall 351 of the housing 311. In this case, the through-holes 222 do not have to be provided in a region, of the screen 221, not covered by the housing 311.

In the above-described embodiment, in the circumferential direction CR on the screen 221, the interval W between the outer peripheral wall 351 and the screen 221 may be the same. In this case, in the circumferential direction CR on the screen 221, the flow path cross section of the discharge path 310 does not change and may be the same.

In the above-described embodiment, the plurality of through-holes 222 does not have to have the same shape. For example, when a pressure difference ΔP is caused to act on openings on both sides of one through-hole 222, in a case in which a flow rate of the air passing through the through-hole 222 per unit time is a flow rate Qh, a value expressed by ΔP/Qh is flow path resistance Rh. If the flow path resistance Rh is the same, the plurality of through-holes 222 does not have to have the same shape.

In the above-described embodiment, the number of the communication holes Ch having the same shape provided per unit area is made less in the downstream screen 221D than in the upstream screen 221U such that, when the downstream screen 221D and the upstream screen 221U having the same area are compared with each other, the air is less likely to pass through the downstream screen 221D than the upstream screen 221U. However, the shape of the communication holes Ch may be made different between the downstream screen 221D and the upstream screen 221U so that the air is less likely to pass through the downstream screen 221D than the upstream screen 221U. For example, the hole diameter of the communication holes Ch provided in the downstream screen 221D may be made smaller than on the upstream screen 221U such that, when the downstream screen 221D and the upstream screen 221U having the same area are compared with each other, the air may be less likely to pass through the downstream screen 221D than the upstream screen 221U. In this case, the number of the communication holes Ch provided per unit area on the downstream screen 221D may be the same as or less than on the upstream screen 221U.

What is claimed is:
1. A defibrating apparatus comprising:
a rotor that rotates around an axis center of a rotation shaft as a rotation center;
a side wall to which the rotor is rotatably coupled;
a defibrating chamber that is partially defined by the side wall, in which the rotor is disposed, and in which a defibrated product is formed from a material containing a fiber by rotation of the rotor;

a supply pipe that is connected to the side wall, is in communication with the defibrating chamber, and supplies the material to the defibrating chamber;

a discharge path that is in communication with the defibrating chamber and to which the defibrated product is discharged from the defibrating chamber;

an annular wall having an annular shape that is provided and spaced from the rotor in a radial direction of the rotor and partially defines the defibrating chamber;

a housing that forms the discharge path extending in a circumferential direction of the annular wall by covering an outer side of the annular wall;

a plurality of through-holes that is provided in the annular wall and causes the defibrating chamber to be in communication with the discharge path;

an outer peripheral wall that is included in the housing and provided at an interval from the annular wall in the radial direction, a discharge pipe that is connected to the housing and discharges the defibrated product from the discharge path; and a discharge unit that causes the discharge path to be in communication with the discharge pipe, the discharge unit being a through-hole provided in the housing such that the defibrated product is discharged from the discharge path to the discharge pipe via the discharge unit by negative pressure being applied, wherein when a first region, of the discharge path, including the discharge unit is a downstream discharge path, a second region, of the discharge path, other than the downstream discharge path is an upstream discharge path, a third region, of the annular wall, constituting the downstream discharge path is a downstream annular wall, a fourth region, of the annular wall, constituting the upstream discharge path is an upstream annular wall, and the through-holes that cause the defibrating chamber to be in communication with the discharge path are communication holes, the communication holes are provided in the annular wall and, a number of the communication holes or a shape of the communication holes in a first part of the downstream annular wall is different from a number of the communication holes or a shape of the communication holes in a second part of the upstream annular wall such that less air passes through the downstream annular wall than the upstream annular wall, and the first part has a same area as the second part.

2. The defibrating apparatus according to claim 1, further comprising:
a closing member on the downstream annular wall of the annular wall, wherein
the closing member closes openings of the through-holes by covering the annular wall.

3. The defibrating apparatus according to claim 1, wherein,
the plurality of through-holes has a same shape, and
the number of the communication holes provided per unit area is less in the downstream annular wall than in the upstream annular wall.

4. The defibrating apparatus according to claim 1, wherein,
the plurality of through-holes has a same shape,
the discharge unit faces the annular wall,
the downstream annular wall includes a facing region that the discharge unit faces, and
the number of the communication holes provided per unit area is more in a region, of the annular wall, farthest from the discharge unit in the circumferential direction than in the facing region.

5. The defibrating apparatus according to claim 4, wherein,
the communication holes are not provided in the facing region of the annular wall.

6. The defibrating apparatus according to claim 4, further comprising;
a closing member on the facing region of the annular wall, wherein
the closing member closes openings of the through-holes by covering the annular wall.

7. The defibrating apparatus according to claim 2, wherein
the closing member is provided on an outer peripheral surface that is a surface on a side of the discharge path of the annular wall and closes the openings of the through-holes on a side of the outer peripheral surface.

8. The defibrating apparatus according to claim 1, wherein,
the plurality of through-holes has a same shape, and
the number of the communication holes provided per unit area, in the annular wall, gradually increases with increase of a distance from the discharge unit in the circumferential direction.

9. The defibrating apparatus according to claim 1, wherein,
the housing forms the discharge path by surrounding the outer side of the annular wall in the circumferential direction.

10. The defibrating apparatus according to claim 1, wherein,
the interval between the outer peripheral wall and the annular wall is narrower in a region, of the discharge path, away from the downstream discharge path in the circumferential direction than in the downstream discharge path.

11. The defibrating apparatus according to claim 1, wherein,
the axis center intersects with a vertical direction, and
the discharge unit is located at a lowermost position of the outer peripheral wall.

12. A fiber body manufacturing apparatus comprising;
the defibrating apparatus according to claim 1;
a web forming unit that is disposed downstream relative to the defibrating apparatus in a transport direction of the defibrated product and forms a web by causing the defibrated product discharged from the discharge pipe to accumulate; and
a fiber body forming unit that is disposed downstream relative to the web forming unit in a transport direction of the web and forms a fiber body containing the fiber by binding the fiber contained in the web.

* * * * *